Figure 1:
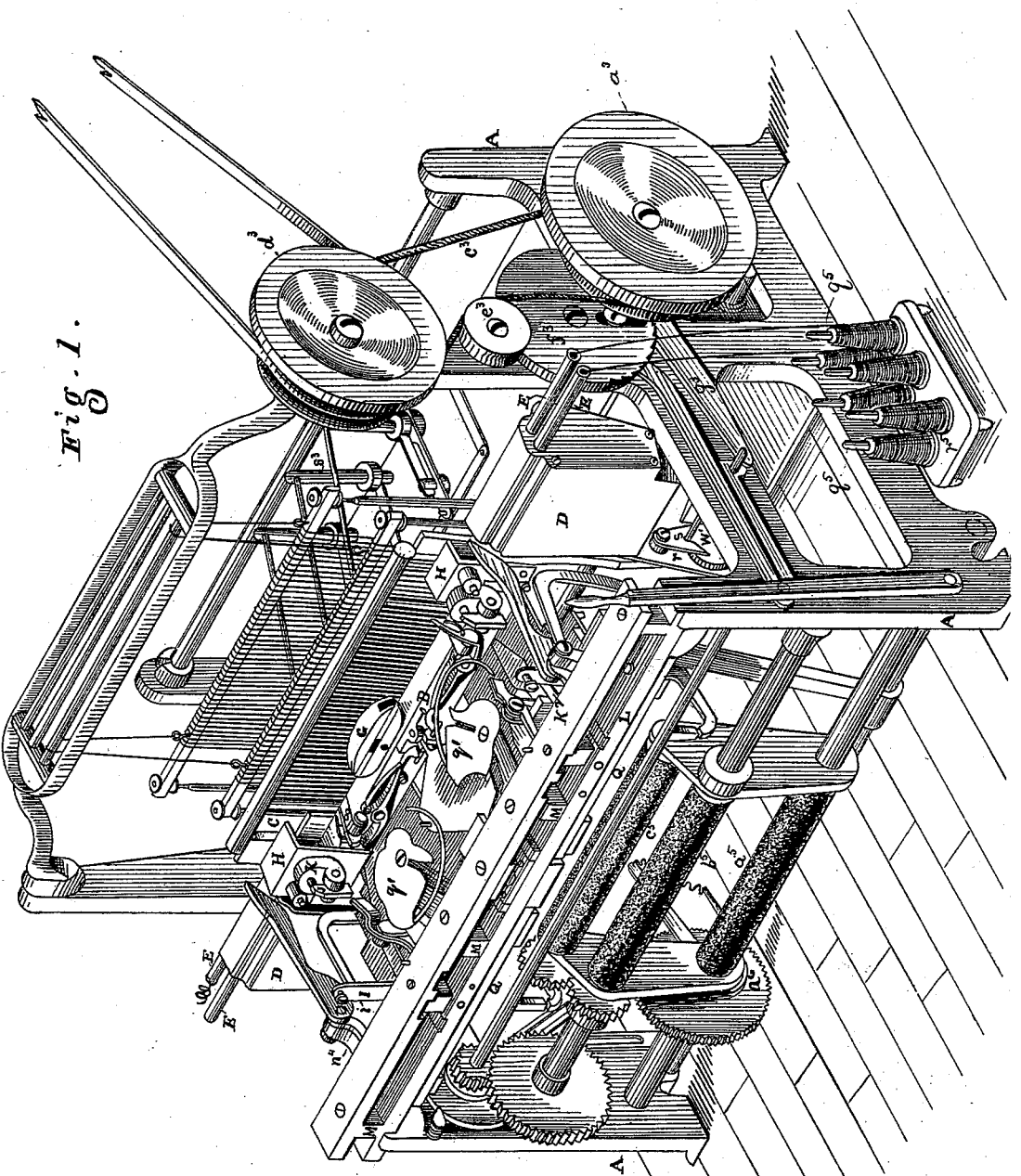

13 Sheets—Sheet 1.

R. H. H. HUNT.
Loom.

No. 214,506. Patented April 22, 1879.

Witnesses
J. M. L. Boone
Frank A. Brooks

Inventor
Robert H. H. Hunt
by Dewey & Co
Att'ys

13 Sheets—Sheet 2.

R. H. H. HUNT.
Loom.

No. 214,506. Patented April 22, 1879.

Witnesses
Jno. L. Boone
Frank A. Brooks

Inventor
Robert H. H. Hunt
by Dewey & Co
Attys

13 Sheets—Sheet 3.

R. H. H. HUNT.
Loom.

No. 214,506. Patented April 22, 1879.

13 Sheets—Sheet 4.

R. H. H. HUNT.
Loom.

No. 214,506. Patented April 22, 1879.

Fig. 4.

Witnesses
Jno. L. Byrne
Frank A. Brooks

Inventor
Robert H. H. Hunt
by Dewey & Co
Attys

N. PETERS, PHOTO-LITHOGRAPHER, WASHINGTON, D. C.

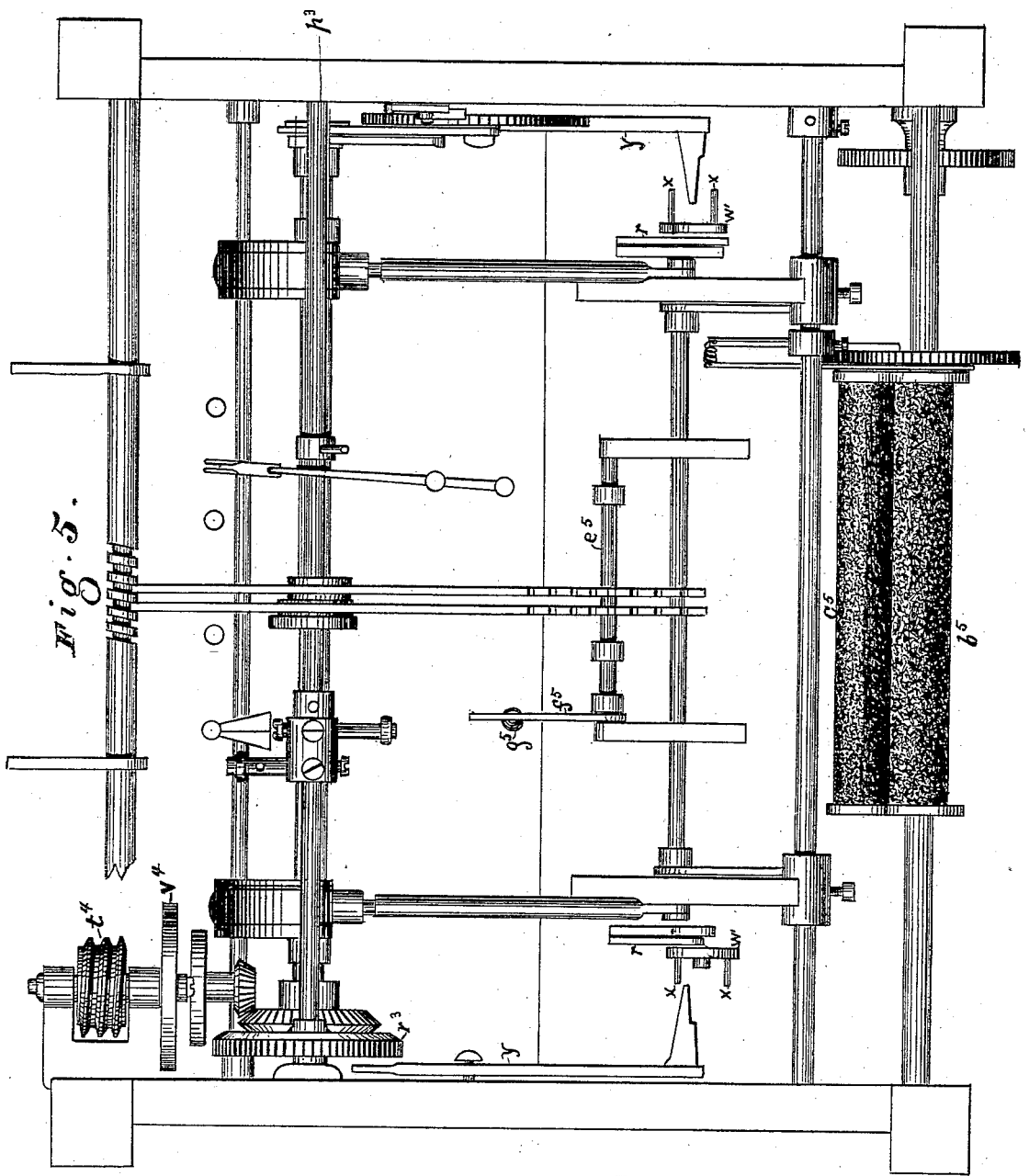

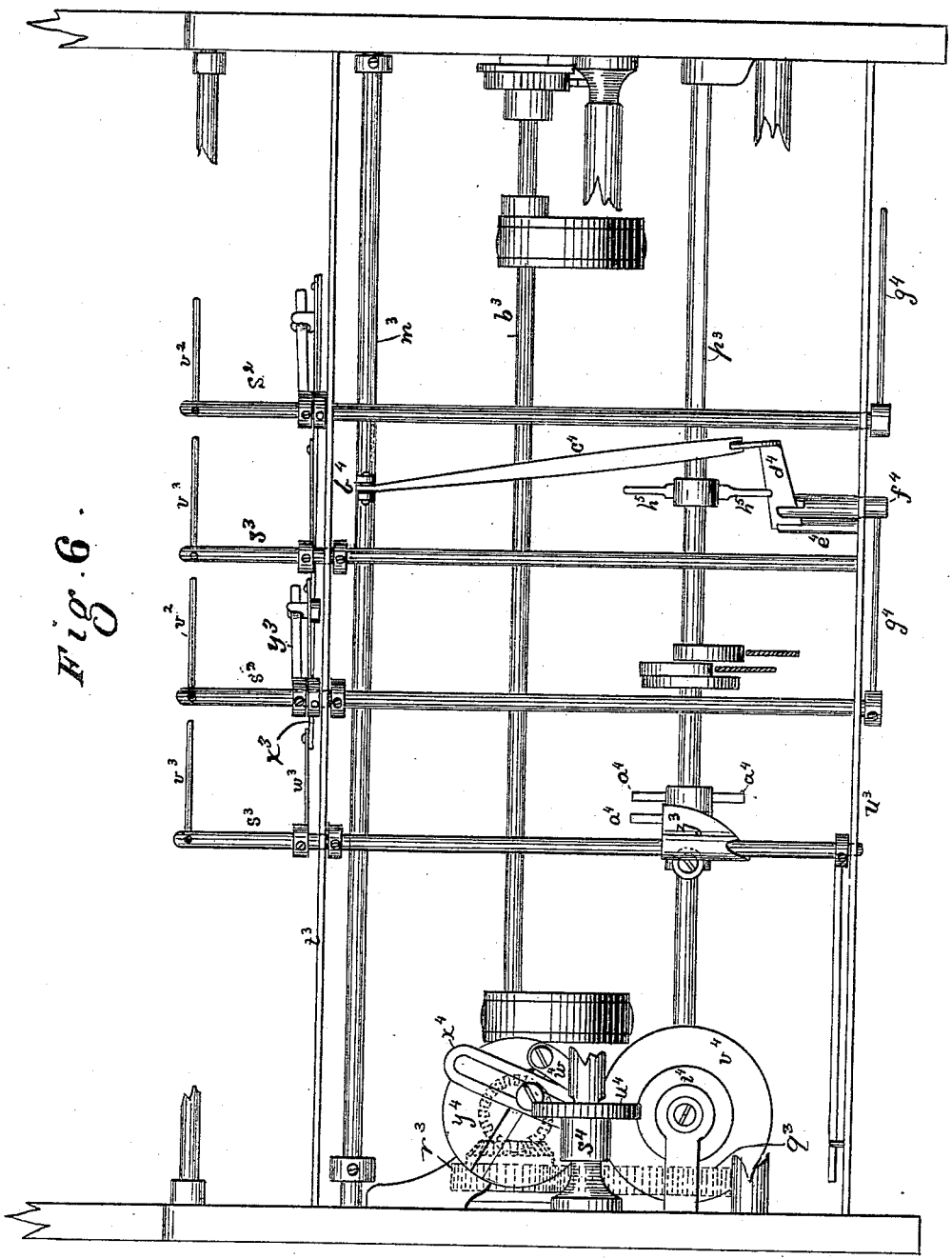

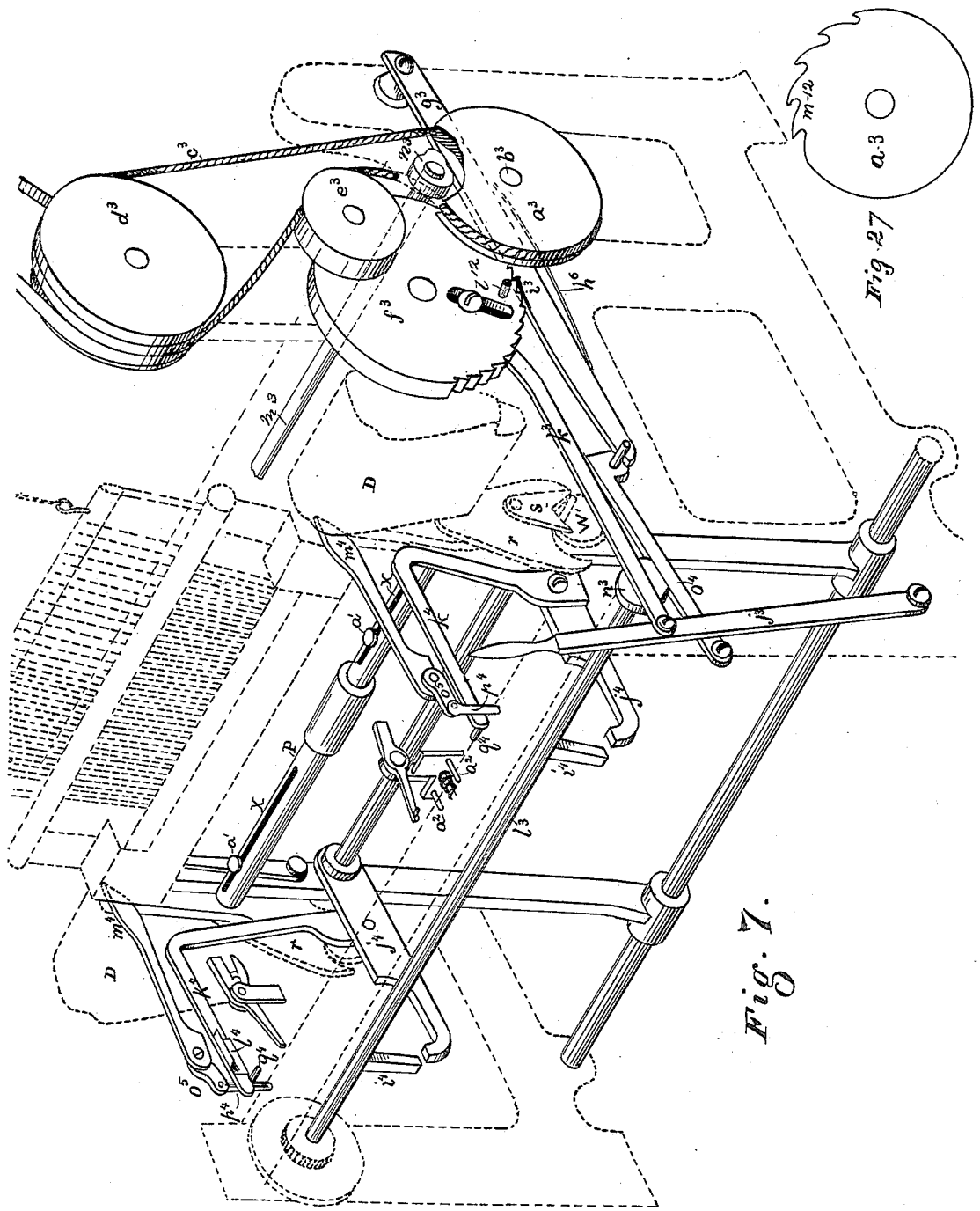

R. H. H. HUNT.
Loom.
No. 214,506.  Patented April 22, 1879.
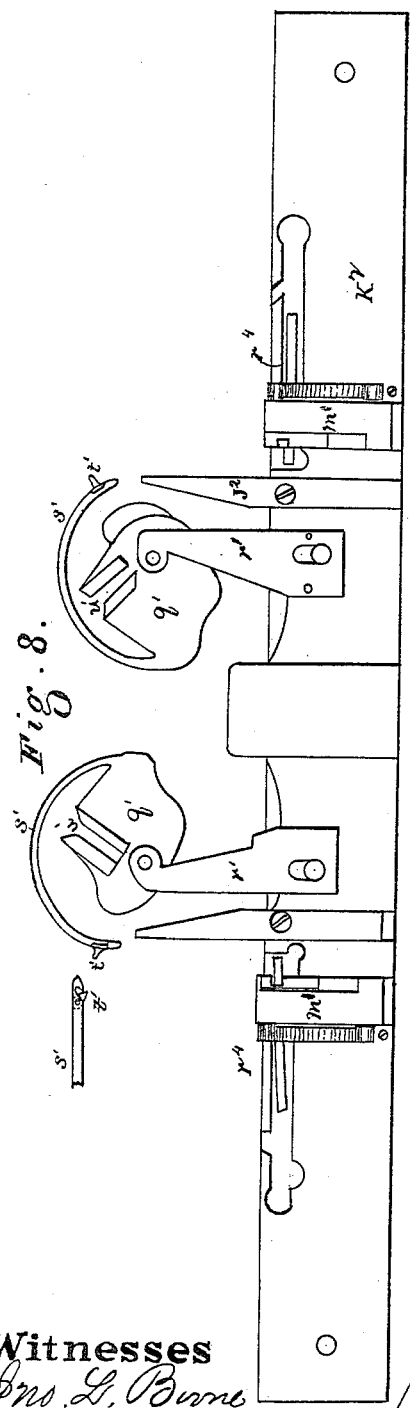
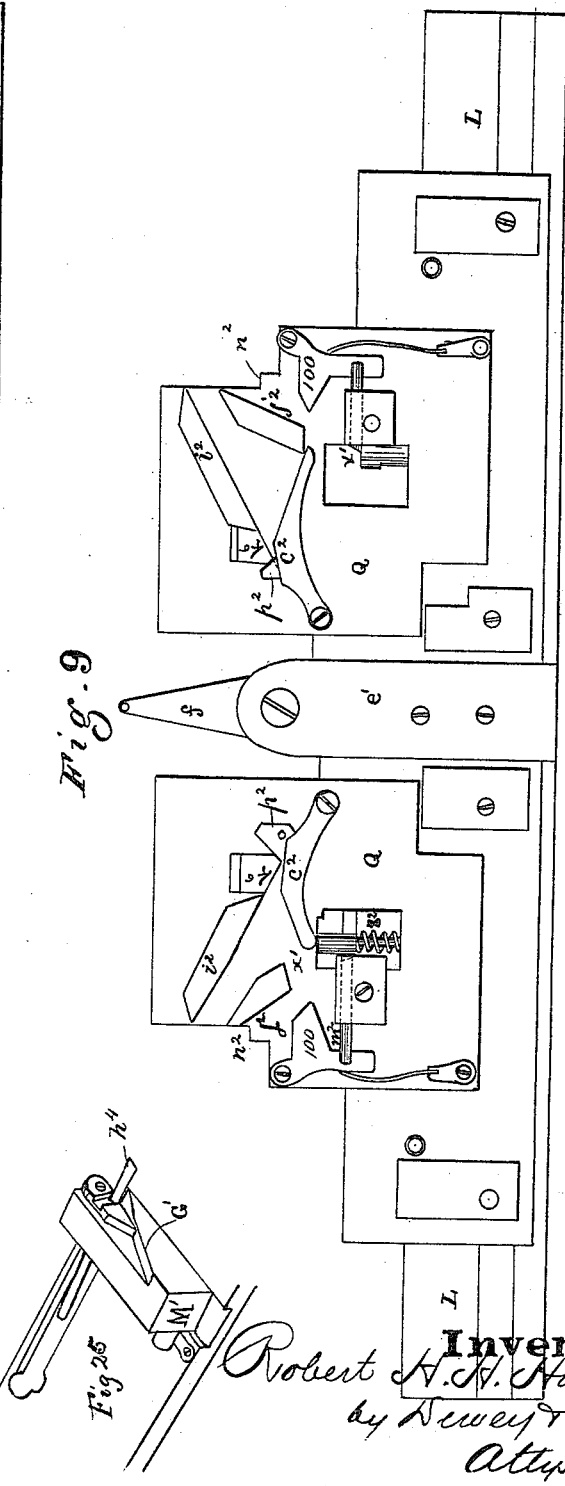
Witnesses  Inventor
Jno. L. Boone  Robert H. H. Hunt
Frank A. Brooks  by Dewey & Co
 Attys R. H. H. HUNT.
Loom.

No. 214,506. Patented April 22, 1879.

13 Sheets—Sheet 9.

Witnesses
Jno. L. Boone
Frank A. Brookes

Inventor
Robert H. H. Hunt
by Dewey &Co
Attys

13 Sheets—Sheet 10.
R. H. H. HUNT.
Loom.
No. 214,506. Patented April 22, 1879.
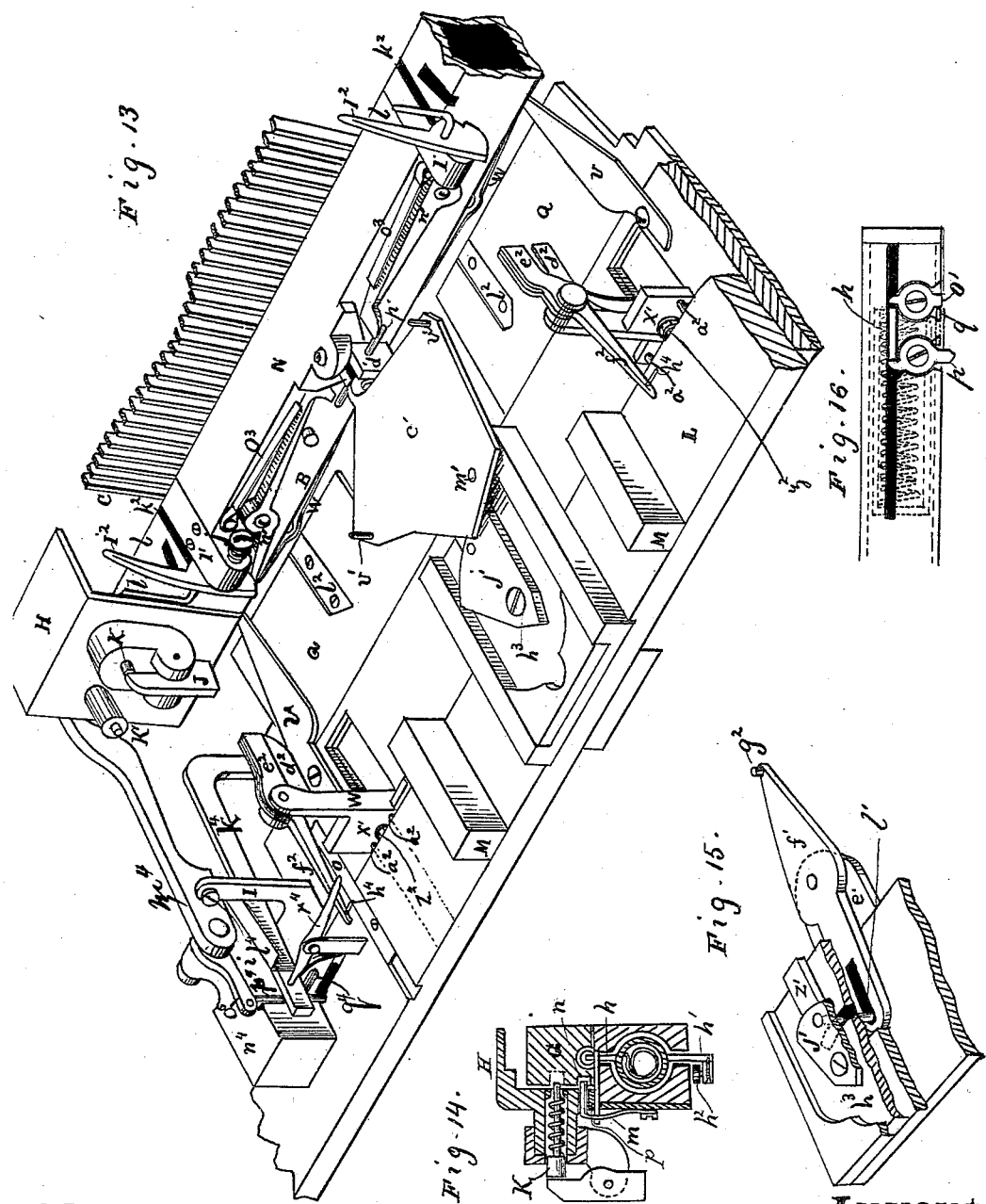
Witnesses
Jno. L. Boone
Frank A. Brooks
Inventor
Robert H. H. Hunt
by Dewey & G
Atty 13 Sheets—Sheet 11.
R. H. H. HUNT.
Loom.
No. 214,506. Patented April 22, 1879.
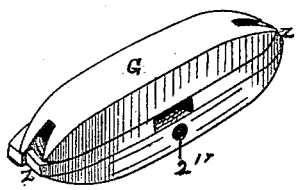
Fig. 17.
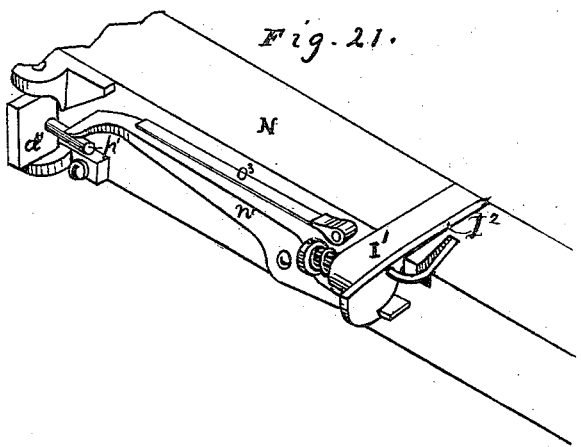
Fig. 21.
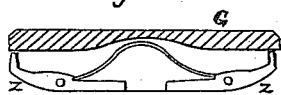
Fig. 18.
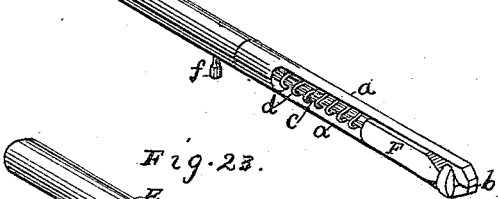
Fig. 22.
Fig. 23.
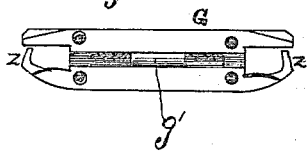
Fig. 19.
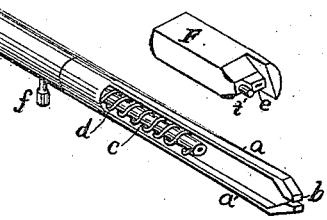
Fig. 24.
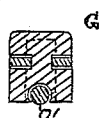
Fig. 20.
Witnesses
Jno. L. Borne
Frank A. Brooks
Inventor
Robert H. H. Hunt
by Dewey & Co.
Attys

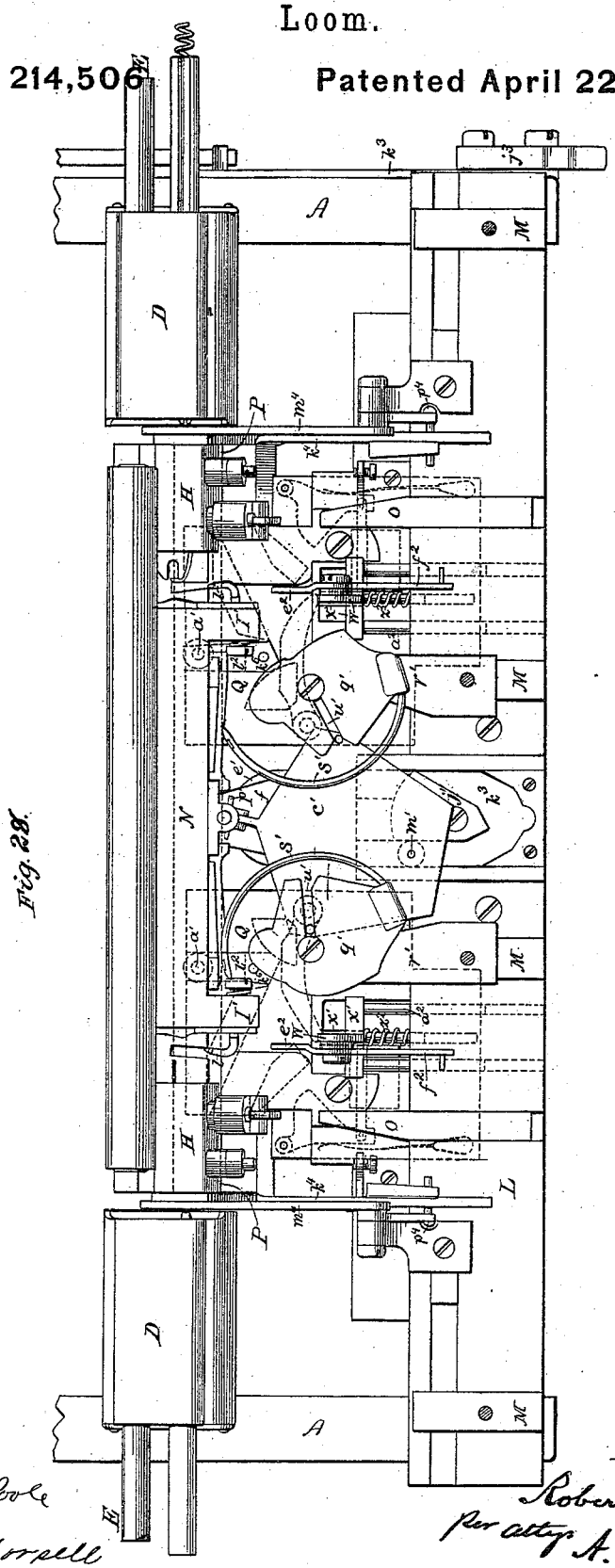

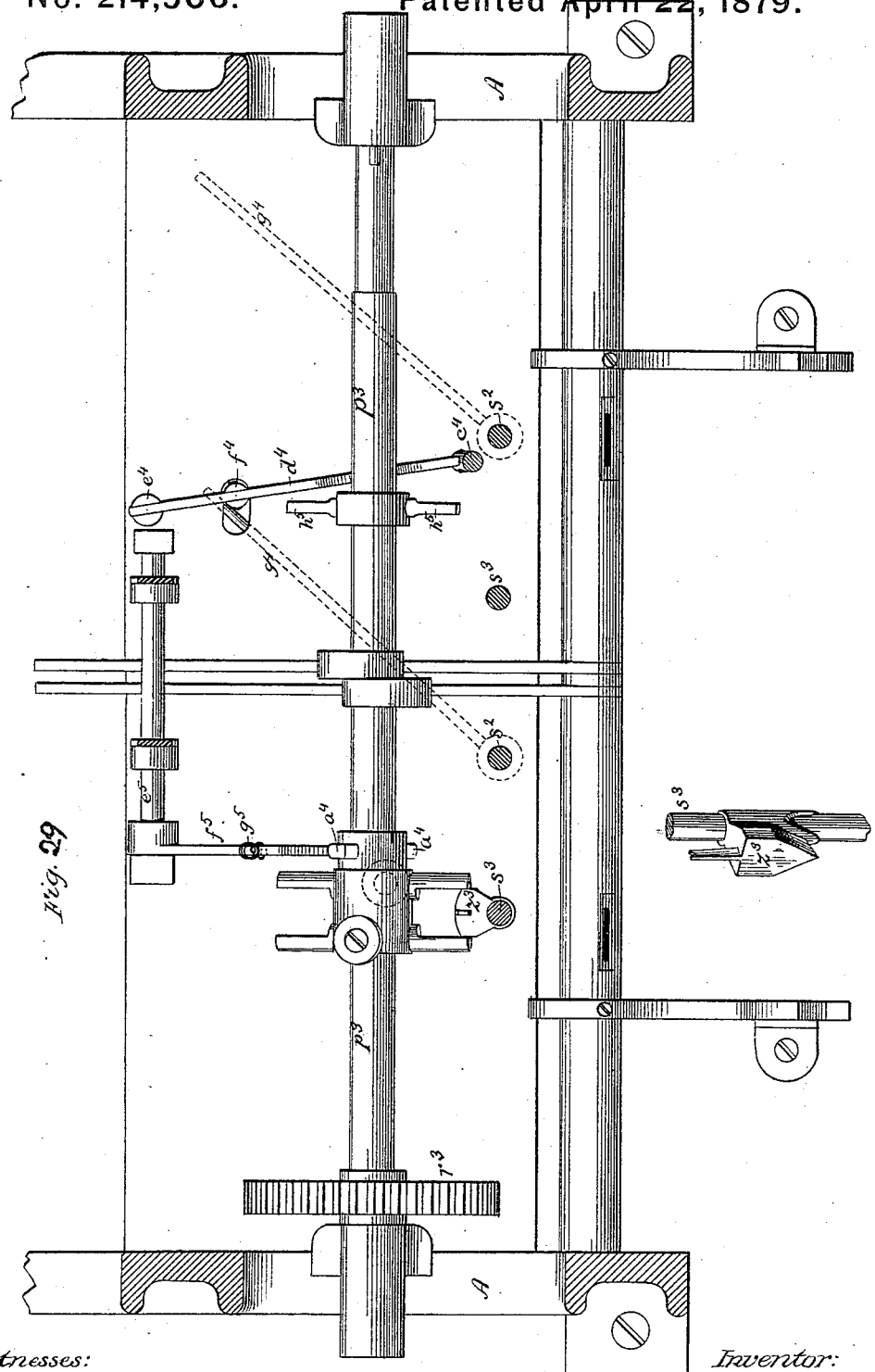

UNITED STATES PATENT OFFICE.

ROBERT H. H. HUNT, OF SAN FRANCISCO, CALIFORNIA, ASSIGNOR OF ONE-HALF HIS RIGHT TO NATHAN W. SPAULDING, OF SAME PLACE.

IMPROVEMENT IN LOOMS.

Specification forming part of Letters Patent No. 214,506, dated April 22, 1879; application filed October 30, 1877.

*To all whom it may concern:*

Be it known that I, ROBERT H. H. HUNT, of the city and county of San Francisco, and State of California, have invented Improvements in Looms; and I do hereby declare the following to be a full, clear, and exact description thereof, reference being had to the accompanying drawings.

My invention relates to improvements in power-looms for weaving fabrics; and it consists in the several combinations of devices, as hereinafter described and claimed.

In my machine the weft or filling yarn is not carried inside of the shuttle, as usual in most former machines, but a number of cops or spools are mounted on spindles outside of the loom, and their yarns or threads are tied together to form one continuous yarn, so that as soon as one cop or spool is exhausted the yarn begins to draw from the next one, and so on, new cops or spools being supplied and connected as often as necessary.

The shuttle is simply a yarn or thread carrier, and for this purpose is provided with a pair of automatic nippers at each end, which seize the end of the yarn or thread which is delivered to it by feeders at each end of the shuttle-race. The shuttle simply carries the yarn through the shed, and while the warp is being crossed by the movement of the heddles the filling is severed from the yarn by a cutter operated automatically at the starting-point of the shuttle, so that the lay beats up a thread or yarn about equal in length to the width of the warp. The ends of the severed wefts will therefore be left projecting from the edges of the fabric. These projecting ends of the yarns or threads can either be left on the edge of the cloth, to be subsequently trimmed off or felted in, or they may be interwoven in the edge of the fabric to form a list or selvage. In the present instance I represent an arrangement of curved needles for drawing in the ends of the yarns or threads, so that they will be interwoven to form a selvage.

My invention also includes the following improvements in looms, which are especially adapted to my improved method of weaving, but which may be applied to power-looms of other constructions: First, an improved arrangement for driving the shuttle; second, certain automatic devices which are operated by a broken thread or yarn to disconnect the loom-pulley from the driving-pulley, said devices being located at different parts of the loom, so that any derangement in the operation, whether created by a broken thread or otherwise, will cause the loom to stop instantly.

Figure 2:
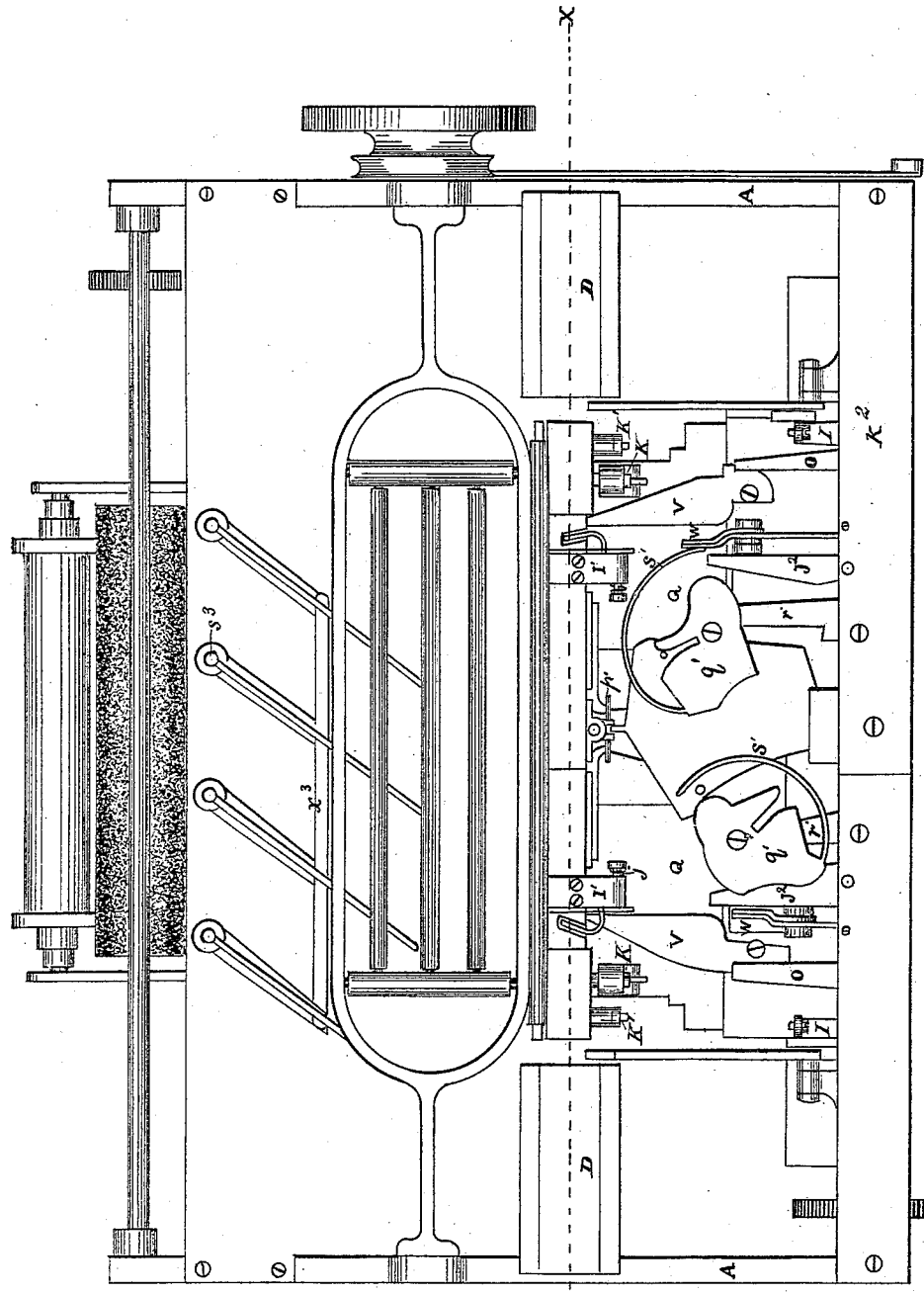
Figure 3:
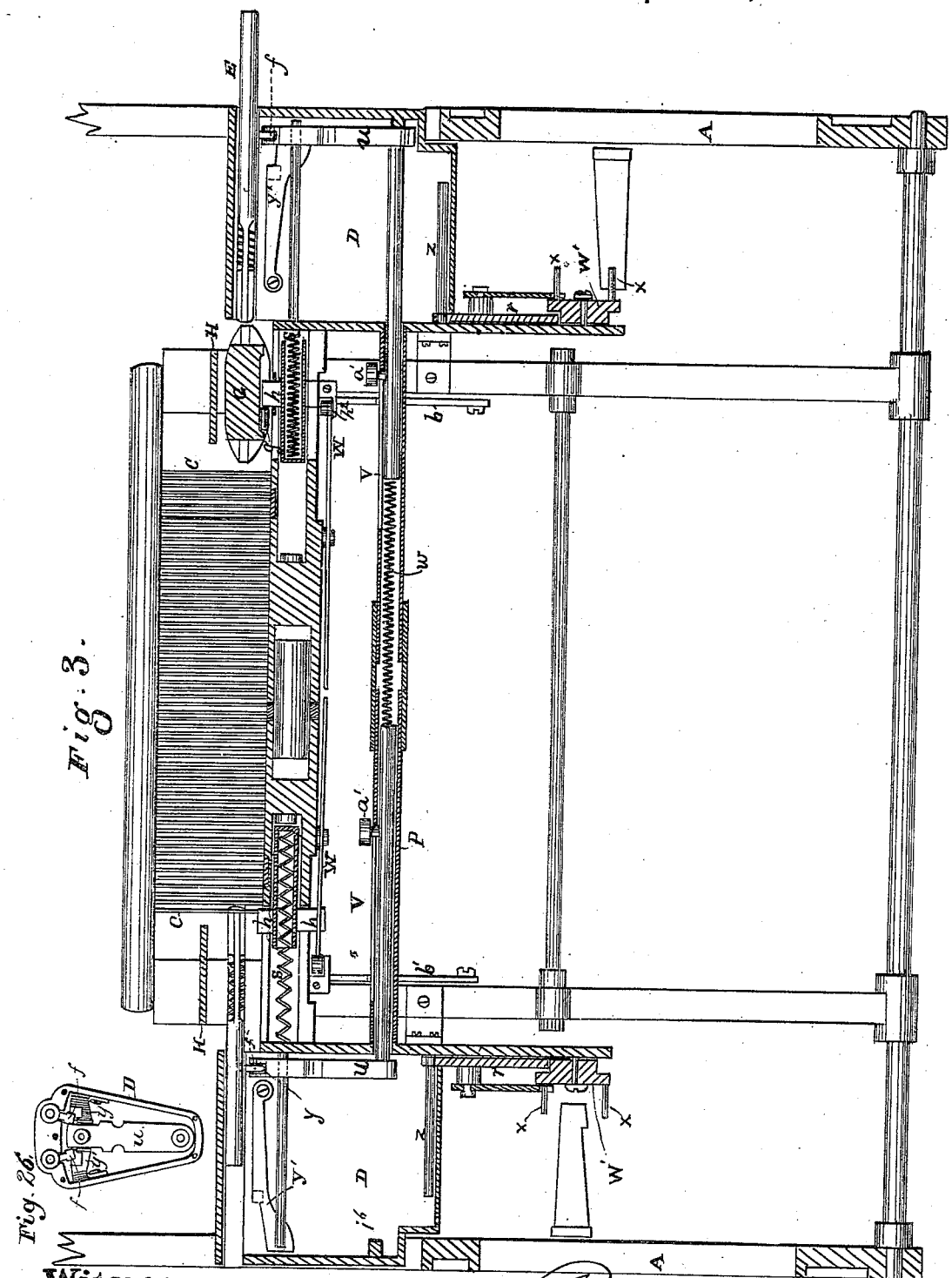
Figure 10:
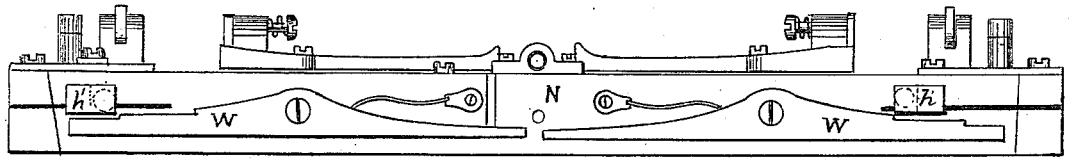
Figure 11:
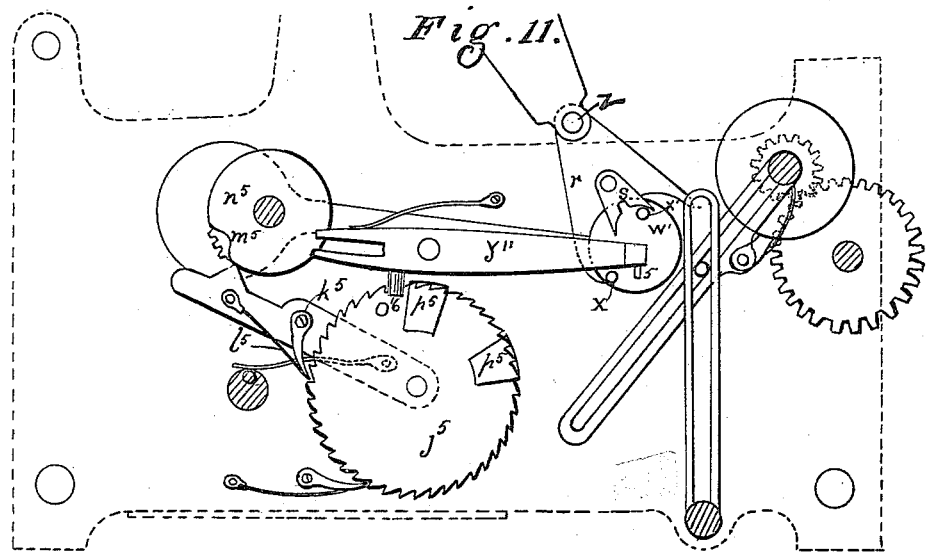
Figure 12:
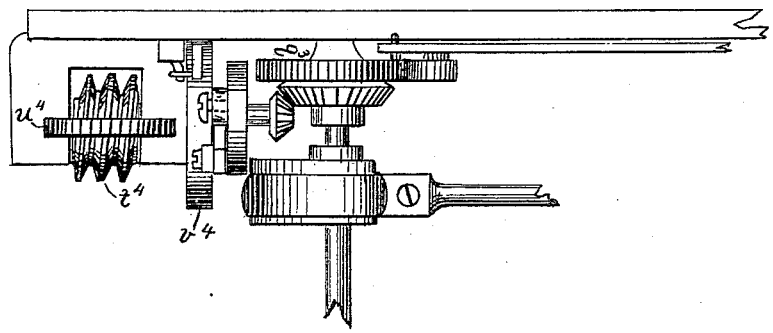

Referring to the accompanying drawings, Figure 1, Sheet 1, is an isometric view of the loom with my improvements applied thereto. Fig. 2, Sheet 2, is a top view. Fig. 3, Sheet 3, is a longitudinal vertical section taken through line $x\ x$, Fig. 2. Fig. 4, Sheet 4, is a transverse vertical section. Fig. 5, Sheet 5, is a bottom view. Fig. 6, Sheet 6, is a rear view of a portion of the loom, showing the warp-sweeps and the mechanism for operating the same. Fig. 7, Sheet 7, is a skeleton view, showing the mechanism for stopping the loom in case of breakage of a thread or yarn in front of the reed. Fig. 8, Sheet 8, is a plan, showing the upper part of the cloth-beam and needles inverted. Fig. 9, Sheet 8, is a plan view of the under side of the lower part of the cloth-plate and plates Q. Fig. 10, Sheet 9, is a bottom view of the shuttle-race beam. Fig. 11, Sheet 9, is a view of the mechanism for shifting the feeder-boxes. Fig. 12, Sheet 9, is a plan of the let-off motion for the yarn-beam. Fig. 13, Sheet 10, is a plan of mechanism in front of the reed, with upper part of breast-beam removed. Fig. 14, Sheet 10, is a transverse section of shuttle-housing, picker, and shuttle-race. Fig. 15, Sheet 10, is a view of the mechanism for operating the latches under the race-beam, with portion broken away to show the operation of the switch-plate and vibrating lever. Fig. 16, Sheet 10, is a view of one end of the race-beam, showing the picker-plate and device for unlatching the shuttle. Fig. 17, Sheet 11, is a perspective view of shuttle. Fig. 18, Sheet 11, is a horizontal section of shuttle. Fig. 19, Sheet 11, is a bottom view of shuttle. Fig. 20, Sheet 11, is a transverse section of shuttle. Fig. 21, Sheet 11, is an isometric of a portion of the race-beam, showing cutter, latching-lever, and device for releasing the latch. Fig. 22, Sheet 11, is a view of a feeder for feeding one or more threads to the shuttle. Fig. 23, Sheet 11, is a view of same with sliding block detached. Fig. 24, Sheet 11, shows the shuttle locked in the act of taking the yarn from the feeder. Fig. 25, Sheet 8, Fig. 26, Sheet 3, and Fig. 27, Sheet 7, are details referred to. Fig. 28 is a top view of the breast-beam and devices thereto attached in operative position, in full and dotted lines. Fig. 29 is a horizontal section, showing the mechanism for operating the warp-sweeps and the stopping mechanism connected therewith.

The same letters and figures of reference which are used to identify a particular part of the machine in one sheet or figure are used in all other sheets to represent the same part.

A represents the frame, and B the lay or lathe, of a power-loom. C is the reed which beats the filling into the warp. At each end of the lay is mounted a box, D, which I call the "feeder-box," because it contains the feeders which deliver the thread or yarns to the shuttle. These feeder-boxes are attached, in the present instance, to the ends of the lay; but it will be evident that they could be attached to the frame, or to some other support properly disposed either inside or outside of the frame, according to the length and construction of the lay.

E E are the feeders, one or more of which may be placed in each feeder-box.

When ordinary plain goods are to be woven a single feeder only will be required at each end, and in this case the feeder-box will remain stationary; but if the fabric is to be woven in various colors, one feeder will be required at each end of the lay for each colored thread or yarn used, and the feeders are then disposed so that a partial rotary motion of the box about a fixed center will bring either one of the feeders opposite the shuttle, according to the colored thread or yarn desired; or the feeder-box could be arranged to move in a horizontal plane to adjust the feeders to the shuttle.

Each feeder consists of a tube, (represented at Figs. 23, 24, and 25, Sheet 11,) which passes horizontally through the upper end of the feeder-box in a plane parallel with the shuttle-race. The inner end of each feeder is cut away on opposite sides for a short distance, so as to leave two narrow arms, $a\ a$, projecting from opposite sides of the tube, and these arms are thinned down to form light springs.

A nipping-jaw, $b$, is formed on the end of each arm or spring, the inside edge of which is inclined, so that the inner edges of the two jaws form a V-shaped angle. A small tube, $c$, projects between these arms or springs from the end of the feeder-tube E to near the outer ends of the springs $a\ a$, the hole through this tube $c$ corresponding in direction with the hole in the feeder-tube E, and is directly in line with the meeting-point of the two jaws $b\ b$.

The small tube $c'$ serves as a guide for a block, F, to move upon. This block is about half as long as the springs $a\ a$, and is cylindrical, with two opposite sides flattened, so that it will fit and move between the springs. The block has a hole through its center, so that it can move over the spindle or tube $c$, and a coiled spring, $d$, is passed over the tube $c$ behind the block, which presses the block forward so that its extremity will bear against the inside V-faces of the nipper-jaws.

The forward end of the block F is nearly solid, and has a nipple, $e$, projecting from its center, through which a small hole is made in line with the main bore of the feeder-tube, and on one side of the nipple $e$ is a projecting inclined face, as represented in Fig. 23.

$f$ is a projecting lug, which engages with the operating mechanism inside of the feeder-box, to give the necessary movement to the feeders, as hereinafter more fully described.

The shuttle shown at Figs. 17, 18, 19, and 20, Sheet 11, is simply a block of metal or other suitable material, pointed at both ends, and provided with a pair of automatic nippers at each end. This shuttle can be made quite small compared with the ordinary shuttle, sufficient weight to keep it on the shuttle-race and give it momentum being all that is required. The side of the shuttle which moves against the reed I make flat, and the outside curved, for convenience.

I apply the propelling force which drives the shuttle from end to end of the race at a point in advance of its center, according to the principle adopted by boys in throwing darts. I apply this principle in the following manner: Near the bottom of the shuttle I make a hole longitudinally through it, and then I make a narrow slot connecting the hole with the bottom of the shuttle, thus forming a groove which is wider at its upper part than the entrance to the groove. In this groove I place a short rod or bar, $g^1$, which can slide freely from end to end of the groove without dropping through the slot in the bottom of the shuttle.

A suitable stop or abutment is arranged at each end of the groove, against which the rod will strike when it arrives at either end of the shuttle. At the same time these abutments do not obstruct the entrance of the propelling device at the ends of the groove. The propelling device which I use in lieu of the picker-staff of an ordinary loom is a plate, $h$, which projects through a slot in the race-beam at each end of the shuttle-race, and which is impelled by the force of a spring to impart an impetus to the shuttle, as more fully described hereinafter.

The rod or bar $g^1$ in the shuttle serves as a buffer, to receive the impact or force of the spring each time the shuttle arrives at the end of the race. As the shuttle enters its housing the picker-plate enters the end of the groove and shifts the buffer to the opposite end, ready for the next impulse.

Each end of the shuttle is bifurcated vertically, so as to form two branches, and each end is provided with a pair of nippers, as shown at Figs. 18 and 19. The rear branch forms the permanent or fixed jaw, while the movable jaw is embedded in the front face of the shuttle. Each movable jaw is pivoted at its middle, so that the end which extends from the pivot toward the middle of the shuttle will serve as a lever to open the jaw at the opposite or outer end when it is pressed inward. Two movable jaws could be applied at each end; but one is sufficient and much more simply operated.

H (see Fig. 13) is a shuttle-housing or open-ended box, into which the shuttle is received at each end of the race. In the side of this housing or box are two pins, K K', which are so disposed that by pressing in on one of them the outer jaw of the shuttle is opened, while the pressure upon the other opens the inner jaw. These pins are operated upon automatically as follows: When the shuttle arrives at one end of the race it is carrying the end of the thread or yarn which it brought from the opposite end of the race, and for reasons hereinafter to be explained it must retain its hold upon this thread or yarn until the lay has beaten up the filling. It must therefore release the end of the yarn as the lay moves back. Meantime, however, the outside jaw of the shuttle can be seizing the end of the thread or yarn, which the shuttle will carry back in its reverse movement.

A standard, I, is secured to the inside edge of the breast-beam, opposite the outside pin, K', and a set-screw passes through it in line with the end of the pin. As the lay moves against the breast-beam the end of this screw strikes the end of pin K' and opens the outside jaw of the shuttle, so that the carrier which is opposite the shuttle can deliver the end of its thread or yarn to the jaw. The other pin, K, is operated as the lay moves back by a plate, J, Fig. 13, Sheet 10, which is centrally pivoted below it, so that its upper end will press upon the end of the pin when its lower end is forced outward. A narrow spring-plate, $o$, is secured to the breast-beam so as to project from it and pass directly under this plate. As the lay beats up, the lower end of the plate J moves up the incline of the plate $o$, and its upper end is forced away from the end of the pin; but as the lay begins to move back the foot of the plate J is forced outward by its friction upon the aforesaid plate $o$, and its upper end presses the pin K inward, so as to open the jaw and release the end of the thread or yarn.

A shear or cutter, Fig. 2, Sheet 2, and Fig. 13, Sheet 10, which serves to sever the filling or weft thread from the length of the thread or yarn which is held by the feeder, is mounted at each end of the shuttle-race. Each cutter consists of a permanent blade or sharp-cornered steel block, $I^1$, which is embedded transversely in the shuttle-race, directly in front of the shuttle, when it is landed in the housing or box, and a movable cutting-blade, $I^2$, which is opened by a spring, $j$.

When the lay is beating up, this movable blade is closed down upon or against the edge of the permanent blade at the end of the race from which the shuttle started by a plate, $J^2$, which projects from the breast-beam, so as to sever the thread or yarn, as above specified.

A recess, $k^2$, is made alongside the permanent jaw, into which the movable blade closes, and is latched after it has been fully depressed. When the movable blade is closed the back of the cutter is flush with the shuttle-race, and it remains in this position until the shuttle has moved over it on its return pick, after which the cutter at the opposite end of the race is closed, the operation of the cutters being alternate.

An arm, $l$, is attached to the movable blade of the shears or cutter, so as to extend toward the shuttle-housing and strike the inclined projection on the end of the feeder E as the shear-blade closes. This forces the block F back on its spindle before the cutter severs the thread, and allows the feeder-jaws to close upon the end of the thread.

The operation of the feeder-jaws at the opposite ends of the race is accomplished alternately and automatically by devices hereinafter specified.

A tubular connecting-beam, P (shown at Fig. 3, Sheet 3,) extends across the lay below the shuttle-race beam, and in this beam the springs which move the feeder-carriers are placed. These devices are partially operated by mechanism attached to the breast-beam.

The breast-beam I make preferably in two parts, $K^2$ L, each of which is a rigid plate or bar of metal or other suitable material. These two parts are separated by blocks M M, so that a space will be left between them.

Plates Q, Fig. 9, Sheet 8, are attached to the lower part, L, of the breast-beam, one near each end of the loom, so as to project back between the shuttle-race beam and tubular connecting-beam. For convenience in adjusting these plates, I first attach them to bed-plates, and then attach the bed-plates to the under side of the breast-beam. These bed-plates can be adjusted as desired, carrying the bed-plates Q with them. This is preferable to making the plates Q adjustable independently.

The plates Q project back, as above stated, between the shuttle-race beam and tubular connecting-beam P, and they carry the cams, levers, and other devices for operating various parts of the mechanism.

A short portion of the race-beam (see Fig. 3) at each end, under the shuttle housing or box, is tubular, and the heads to which the picker-plates $h$ are attached move inside of said tubular portions. A spring, S, in each of these tubular portions forces its respective head and plate forward to drive the shuttle.

As before stated, the plates $h$ project up through a slot in the beam. An arm, $h^1$, extends from each of these plates (see Fig. 14) down through a slot in the under side of the beam, and has a friction-roller, $h^2$, secured horzontally upon it.

A plate $v$, projects from the lower part of the breast-beam at each end, opposite the picker-arm $h^1$, the outside of said plate $v$ being made inclined or tapering, so that as the lay beats up a filling the inclined edge of each plate will strike the corresponding roller $h^2$ and force it outward toward the extremity of the race-beam, thus condensing the spring and forcing the plate $h$ to its set position. A spring-latch, $w$, (see Fig. 10,) then engages with the picker-arm $h^1$ and latches the plate in its set position, ready to be released to throw the shuttle, as before described.

When the shuttle arrives home after each pick it must be locked in place until the next impulse is given it to drive it on another pick, and this lock must be released at the same time, or rather just an instant before, the impulse is given to the shuttle. To do this I secure one end of a flat spring, $m$, (see Fig. 14,) to the outside of the shuttle-housing, and to the upper end of this spring I secure a pin or bolt, $n$, which projects through a hole in the housing.

The shuttle is provided with a hole, $2^{17}$, in its outside face, so that as the shuttle enters the housing its tapering form will crowd the pin or bolt back until it comes opposite the hole or socket, when it will drop into the socket $2^{17}$ and lock the shuttle in place. To disengage this bolt at the proper instant, I make two transverse recesses in the upper side of the race-beam, between the slot in which the picker-plate $h$ moves and the outside of the beam. These recesses I make close together, and in each I secure a lever horizontally by a rivet or screw, which passes through its center. The inner end of the outside lever, $o^1$ (see Fig. 16)—or, in other words, the lever which is nearest the end of the race-beam—extends across the slot in which the picker-plate $h$ moves, while its outer end is flush with the outside face of the beam. The lever $p$ also extends across the picker-slot at its inner end, while its outer end projects beyond the outside edge of the beam. A pin, $q$, is arranged to slide in a hole in the beam between the outer ends of these levers, so as to connect the movement of one lever with the other.

The extremity of the outer end of the lever $p$ is formed with two angles, as represented at Fig. 16, Sheet 10. One edge is beveled in one direction and the other is beveled in an opposite direction, so that when the lever is at oblique angles to the race-beam the outside beveled or angular face will be flush with the outside edge of the beam; but when the inside end, which crosses the picker-slot, is moved toward the middle of the beam, the projecting angle between the two inclined edges will push the spring $m$ outward before the opposite face comes opposite the spring $m$. Now, as the picker-plate is moved back by the inclined edge of the plate V, it passes the trip-point or end of the lever $p$ and strikes the inner end of the lever $o^1$, and by moving this lever back forces both levers to a position at right angles to the beam, thus moving the pin back as the shuttle enters the housing, and dropping it as soon as the shuttle is in place, and throwing the trip-point of lever $p$ across the slot in front of the picker-plate $h$, ready to be tripped when the shuttle moves out again.

The shuttle being in its housing and locked by the pin $n$, when the lay moves back after beating up a filling the latch W for locking the picker-arm is released by a pin, $g^2$, on the end of a vibrating plate, which will be hereinafter described. This releases the spring S, so that it will drive the picker-plate $h$ forward and throw the shuttle. The first motion of the plate $h$, however, in starting on a pick, causes it to strike the projecting end of the lever $p$, which crosses the slot in front of it and moves it forward. The motion imparted to this lever by this initial movement causes the apex of the V-shaped or projecting angular point at the outer end of the lever to strike the spring $m$ and force it outward, so as to withdraw the pin $n$ from the hole in the shuttle. The operation occurring at the same moment or just before the impulse is given to the shuttle, the latter is free to be thrown, both operations being performed almost simultaneously. When the shuttle returns it finds the trip-point of the plate $p$ out of the way, and passes by it, but strikes the inner projecting end of the outside plate, $o^1$, and by pressing forces both levers again to a position at right angles to the length of the beam, ready for another pick.

The feeder-box D can be made in any desired shape or form. Where a large number of feeders are to be used, probably the best form would be cylindrical, and the feeders could be arranged around its periphery. This box is mounted upon a pivot or shaft, about which it moves as a center to bring either feeder or each successively opposite the shuttle, according to circumstances. In the present instance I have represented a box with two feeders, and the motion imparted to it is reciprocatory, so as to bring first one and then the other feeder opposite the shuttle alternately.

The feeder-carrier, which is hereinafter described, has a transverse slot in its upper edge, in which the lug of each feeder is caught alternately as the box carries the feeders to it. A spring with a ledge on its free end is arranged inside of the box D, on each side of the feeder-carrier, as shown at $y^1$ $y^1$, Fig. 26. As the ledges are in line with the slot of the feeder-carriers, the box D, in shifting its position, alternately moves the lugs of the feeders on and off these ledges and into and out of the slot. As the free ends of the springs lie against the feeder-carrier, the movement of the box presses or releases them, and thus moves them out of the way of the lug and feeder-carrier, or admits of their holding the lug in position to enter the slot, and, together with the pin $i^6$ on the inside of the box, prevents the feeder-lug from becoming accidentally disarranged, and keeps it always in position to enter the slot. The feeder-carrier also strikes a projection, $i^6$, on the inside of the end of the box when it moves out, thus causing its slot to be arrested in the proper position to receive the lug of the feeders.

The shaft or center about which the box moves is marked $z$. (See Fig. 11.) An arm, $i$, extends below this center, to which is attached a plate, $s$, the lower end of which has an inverted-V-shaped notch in it. A wheel, $w^1$, is mounted on a center below this plate, and has two outward-projecting arms or pins, $x$ $x^1$, one of which projects from its upper edge, while the other projects from its lower edge. The upper pin moves in the angle of the V-shaped notch in the plate $s$.

A lever, $y''$, (see Fig. 11,) is pivoted to the frame back of the lay, the forward end of which extends forward opposite the center of the wheel $w^1$, and is provided with an arm or head, 5, which extends at right angles from its extremity toward the wheel $w^1$. This lever is operated by mechanism hereinafter described.

To illustrate the method of moving the feeder-boxes, I will take the case in which it is desired to weave an article having fillings of different colors alternating.

The first motion carries the end of the arm or head of the said lever from opposite the upper pin, $x^1$, to a position intermediate between the two pins, and this motion is accomplished while the lay is making one beat. During the next beat of the lay this lever is moved downward, so as to carry its extremity opposite the lower pin, $x$, in time to strike it, and thus partially rotate the wheel $w^1$. This causes the upper pin, $x^1$, to press upon the rear incline of the V-notch of the plate $s$, and move the box D about its center $z$, and bring the forward feeder opposite the shuttle. The next beat of the lay lifts the arm of lever $y''$ to its intermediate position midway between the two pins, and as the arm at the opposite end of the machine operates alternately, the box D at that end is shifted during this alternate beat of the lay, so as to carry one of the feeders opposite the shuttle on that side. The next beat of the lay raises the arm of lever $y''$ opposite the upper pin, $x^1$, and rotates the wheel $w^1$ in an opposite direction, thus shifting the box forward so as to bring the rear feeder opposite the shuttle, and so on, each alternate beat of the lay shifting the feeders at each end of the race. The shuttle is projected by the picker-plate as the lay recedes after each beat, similar to any ordinary loom. When it arrives in its housing it is locked automatically by the bolt $n$, as before described. As the lay beats up the last weft-thread laid in by the shuttle the pin $k^1$ comes in contact with the set-screw in the standard I, and the outside jaw of the shuttle is opened. Simultaneously with this movement the feeder which is in line with the shuttle is projected forward slightly, so that the closed jaws of the feeder which carry the yarn or thread enter between the open jaws of the shuttle, as shown at Fig. 24, Sheet 11. The block F is pressed back on its spindle by the jaw of the shuttle coming in contact with the projecting pin $t$. As soon as the pressure on the pin $K^1$ is relieved by the backward movement of the lay, the jaw of the shuttle closes on the thread or yarn, close to the block F, inside of the feeder-jaws. The feeder is then withdrawn or moved back into its box again. Owing to the V form of their inside faces, the jaws $b$ are forced open, and the feeder is withdrawn, so that the shuttle-jaws retain their hold upon the thread or yarn.

As the feeder is withdrawn the spring $d$ forces the nipple $e$ between the feeder-jaws, so as to hold them open and allow the thread or yarn to pass readily through. During this operation at one end of the race, the picker-plate is being retracted and set, and the cutter has severed the filling-yarn which the lay had beaten up at the other end. When the lay recedes to its utmost the picker-plate and device which projects the feeder are both released simultaneously, so that the shuttle is sent on another pick, drawing the yarn from the feeder through the shed, while the feeder follows far enough to enter its forward end close to or a short distance into the shed of the warp. The cutter at the opposite end of the race (see Fig. 13) then descends and severs the thread near the warp, and the arm $l$ strikes the inclined face of the block F, so as to push the block back from between the jaws of the feeder and allow them to close upon the end of the laid thread at the same instant the nippers $e^2$ $d^2$ are projected forward and closed down upon the yarn held by the shuttle, as hereinafter more fully described.

The device $u$, (see Fig. 3,) which carries the feeder (hereinafter described) in and out of the box D, is connected, by a rod, V, with a spring, $w$, which is placed in the tubular connecting-beam P. This spring draws the rod toward the middle of the beam and carries the device $u$ against the inner end of the box.

A slot, $x$, (see Fig. 7,) is made in the upper side of the beam P, at each end, and a pin projects from the outer end of the rod up through it, and on each pin a roller, $a^1$, is secured horizontally. These rollers move in certain grooves on the under side of the plate Q as the lay beats back and forth, so as to give the shifter device the proper motion.

The device $u$ has an open transverse slot near its outer end, and as it remains stationary when the box D is shifted, the lugs $f$ on the feeders are successively moved into the slot, so that the feeders are carried with the device when it moves.

A latch-plate, $b^1$, Fig. 3, engages with the rod V, to which the roller $a^1$ is attached, when the roller is forced to the outer end of the slot, and this latch is released by the operation of the lay B about the same time the picker-plate is released.

I have devised a peculiar mechanism for alternately releasing the latches at the opposite ends of the race. This device also operates the needles which draw in the ends of the weft or filling to form the selvage, and releases the shear-latches.

In a full-sized loom I shall use two of these devices, one near each end of the breast-beam; but in the present instance I have represented only one, which is located opposite the middle of the race. It consists of a plate, $C^1$, (see Fig. 13,) the rear end of which is pivoted to a block, $d^1$. This block is mounted on the front of the race-beam at its middle, so that it can vibrate horizontally. To the plate $C^1$ I impart a swinging motion from side to side horizontally by means of a peculiar switch and track, which is described as follows: An arm, $e^1$, (see Fig. 15,) projects toward the lay from the under side of the breast-beam, opposite or in front of the mounted block $d^1$, and upon this plate is a lever, $f^1$, which is pivoted to it at its middle, so that one end projects to the rear below the race-beam, while its forward end projects toward the breast-beam, as represented at Fig. 15, Sheet 10. The rear end of this lever has a pin or stud, $g^2$, projecting upward from it, which serves to strike and trip and release the picker-latch on each side alternately. The forward end of the lever is slotted lengthwise.

A shallow box, $h^3$, is secured upon the lower part of the breast-beam, so that its rear end projects over the slotted end of the lever $f^1$. This box has shallow raised sides and a curved rim around its forward end, while its rear end is open. A block, $Z^1$, is secured midway between its sides at its rear end, so as to leave a groove or passage on each side between it and the raised sides. A V-shaped switch-plate, $j'$, is then secured by a pivot in the bottom of the box. The apex of this switch-plate is sufficiently far from the curved outer rim to provide a track or passage-way equal in width to the passage-way on each side of the block $Z^1$, and the pivoted point about which it swings is a short distance in rear of the apex or pointed end. A pin extends from the rear end of this plate down through a curved slot in the bottom of the box, and moves freely in the slot in the front of the lever $f^1$. Now, by moving the rear or wide end of the switch-plate over against either side of the box, a channel or groove is formed on the opposite side, and the point or apex of the plate is shifted to one side of a direct line drawn longitudinally through the middle of the box. The plate $C'$ has a roller, $m^1$, on its under side, near its forward end, and this roller moves in the groove thus formed, and automatically throws the switch-plate $j^1$ as it passes back along either side, leaving a free track for it to move forward in on its reverse motion. The roller $m^1$, which moves in this track, will then move along the unobstructed track as the lay beats up a filling, and be carried past the apex or point of the V-switch $j^1$, so that when the lay starts back the roller will be compelled to take the opposite track, and as it moves outward it will crowd the wide end of the switch over across the opposite track, and thus place it in position to repeat the operation, but in reverse direction, when the lay beats up again. This accomplishes two objects. It imparts to the plate $c^1$ a swinging motion from side to sides and gives the wide end of the switch-plate $j^1$ a uniform transverse motion back and forth. The pin $l^1$, which extends down from the rear end of the switch-plate $j^1$ and moves in the slot in the forward end of the lever $f^1$, imparts to the rear end of the lever a back-and-forth side motion, so as to move said end lever alternately from side to side, so that its pin $g^2$ can release the latches which lock the picker-plate at the opposite ends of the race alternately, performing the operation at the proper instant upon each side just as the lay reaches its farthest position from the breast-beam, or at the instant the shuttle is ready to be thrown.

The swinging plate $c^1$ performs two duties. It alternately releases the cutting-blades which sever the yarns at each end of the race, and operates the needles which draw in the ends of the yarns to form the list or selvage.

The movable blade $I^2$ of each cutter has a notch on its under side, with which the end of a lever, $n^1$, engages when the cutter is closed down. This lever is secured by a pivot, near its middle, to the front of the race-beam, so that its outer end passes under the rear end of the cutter, one lever being arranged on each side of the middle of the race. A spring, $O^3$, presses the inner end of each lever down, so that the outer end will readily pass into the notch of the cutter when the blade is closed. The inner end of each lever extends close up to the swinging block $d^1$, and is provided with a projection on its extremity, which is made inclined on its under side. A pin, $p^1$, projects from each side of the swinging block $d^1$, so that, as the block swings from side to side, the ends of the pins will alternately pass under the inclined faces of the projections and lift the inner ends of the levers, thus depressing the outer ends of the levers, so that they will be released from the notches in the cutter-blades. The spring $j^1$ then raises the released blade ready for another cutting operation. Thus one of the cutters is released at a time, and the operation is alternate.

A plate, $q^1$, (see Fig. 8,) is attached by a rivet or screw to the end of a projecting arm, $r^1$, which extends from the upper part of the breast-beam, one on each side of the swinging plate $c^1$. To each of these plates a curved needle, $s'$, is attached, said plate being so pivoted that the needle and plate can be partially rotated for the purpose of drawing the severed end of the thread or yarn into the warp to make a list or selvage. Just back of the point of each needle a barb is made on its under side, which is similar to the barb of a crochet-needle. A small pointed pendant, $t^1$, is attached to the needle just back of the barbed point, which serves as a fender and latch to close the opening of the barbed point after the yarn is caught.

Each plate has a slot or recess, $u^1$, extending inward from its edge. The swinging plate $c^1$ has a pin, $v$, projecting from each side, so that, as the plate is carried to either side by the roller which moves in the grooves hereinbefore specified, the pin on that side will enter the slot or recess in the needle-plate, and as the swinging plate moves forward will carry the point of the needle around between the warp, so that its barbed point will catch hold of the end of the thread or yarn, which is held by a pair of nippers, $e^2$, and as the plate $c^1$ moves back by the reverse motion of the lay the needle-point will be retracted, so as to draw the end of the thread between the warp, and thus form a selvage or list.

The swinging pendant $t^1$ serves as a latch to protect the open barb, and prevents the barbed point from becoming entangled with the threads of the warp as the needle is retracted, while it does not prevent it from taking hold of the loose end of the filling-yarn.

Each pair of nippers $e^2$ $d^2$ is mounted upon a block or head, $x^1$, to which one or more slide-rods, $a^2$ $a^2$, are attached. These rods move in holes in the lower part of the breast-beam, and a spring, $z^2$, projects the block and nippers forward when the block is free. A portion or end of the block $x^1$ projects down through a slot in the plate Q.

A lever, $c^2$, (see Fig. 9,) has one end pivoted to the under side of the plate Q, so that when its free end is pressed toward the front of the machine it will strike the portion of the block which projects below the plate.

A pair of nippers is mounted opposite each end of the race. Each pair (see Fig. 13) consists of a permanent or fixed horizontal jaw, $d^2$, and a movable jaw, $e^2$. The upper jaw has a lever-extension, $f^2$, which projects forward under the upper part of the breast-beam, and a supplementary block, M', (shown inverted at Fig. 26, Sheet 8,) is secured beside each of them. This block has a portion of its rear lower corner next to the lever removed, so as to provide an inclined overhanging ledge, G', which pitches upward from the front of the lower part of the beam toward the rear edge of the upper part.

A pin, $h^4$, projects at right angles from the forward end of the lever-extension, so as to strike and move down this incline when the nipper-block is forced toward the cloth beam, thus opening the movable upper jaw.

The movable jaw is closed by a light spring as the block $x^1$ and the nippers are projected forward when the bolt that latches the block is withdrawn. After the shuttle has carried the thread across the race, and just before the inside shuttle-jaw is opened by the pin K, the roller $a^1$, (see Fig. 3,) traversing in its path on the under side of the plate Q, comes in contact with the trip, which withdraws the bolt and releases the nipper-block.

The spring $z^2$ projects the nippers and block forward, so that the upper jaw will close upon the thread or yarn just before the pin K releases it from the shuttle-jaw. The pressure of the spring which closes the movable jaw being light, the thread or yarn is easily drawn from the nippers by the needle. The jaws are made to close past each other if no thread or yarn is caught by them, and this causes the rear end of the lever to rise farther than it otherwise would, and operate to release the belt which drives the loom, as hereinafter explained.

The roller $a^1$ traverses in certain paths on the under side of the plate Q, in order to give the proper motion to the feeders, and at the same time set and release the nippers at the proper moment.

The movements and operations of the roller $a^1$ at each end of the machine being the same, I will describe the operation of one only.

On the under side of the plate Q are two ribs or blocks, $j^2$ and $i^2$, Fig. 9, Sheet 8. The block $i^2$ extends from near the outside corner of the plate at an angle inclining toward the center of the plate, while the block $j^2$ stands at an angle to the block $i^2$, leaving sufficient space between the plate $j^2$ and its ends for the roller $a^1$ to pass through.

At the upper end of the block or rib $i^2$ is a small block, $k^6$, which is secured to the end of a spring, $l^2$. (See Fig. 13.) The spring is secured to the upper side of the plate Q, while the block $k^6$ extends down through a hole in the plate, and projects a short distance below it, in line with the block or rib $i^2$. The portion or side of the block toward the rear edge of the plate is inclined, so that the roller, passing directly toward it from the rear edge of the plate, will move against the incline and press the block $k^6$ back into the recess in the plate until the roller passes it. The block is then pressed down again by its spring $l^2$, so as to bar the roller from moving back on the same track; but as soon as the roller strikes it it is guided by its projecting edge down the incline of the block $i^2$. The feeder is projected forward from its box into the shuttle-housing simultaneous with the flight of the shuttle through the warp. As the lay moves forward the roller is carried directly toward the block $k^6$, which it depresses and passes over. It is then carried forward, so as to force the lever $c^2$ toward the front of the machine, and the nipper-block $x^1$ is latched by the bolt $m^2$. Said bolt is provided with a bevel upon its end, which is acted upon by the block $x^1$ as it is moved back. The spring attached to lever 100, to which the bolt is pivoted, acts to throw the bolt forward and latch said block as soon as it has reached the proper position. This sets the nipper-block $x^1$ and the roller striking. The inclined edge of a small block, $p^2$, is carried outward, so as to withdraw the feeder from the edge of the warp, as heretofore described. Meantime the spring-block $k^6$ has been projected across the path of the roller, so that as the lay moves back it will be compelled to travel down the inclined side of the block $i^2$ to the outer end of the slot, where it is latched by the latch-plate $b^1$. (See Fig. 3.) As the lay moves out on another beat the roller is carried directly forward along the outside face of the plate Q until a projection, $n^2$, (see Fig. 9,) on the edge of the plate forces the latch-plate $b^1$ backward and releases the roller, which is immediately moved by its spring toward the inner end of the slot until it encounters the upper end of the inclined block $j^2$. It then strikes lever 100, forcing it back, whereby it moves back the latch-bolt $m^2$, which releases the nipper-block, and as the lay moves back it is forced to travel down the inclined edge of the block $j^2$, which carries it again to the outer end of the slot, thus carrying the feeder away from the shuttle. When it passes the lower end of the block $j^2$ again it is engaged by the latch $b^1$, and is released at the same instant the picker-plate is operated, so that it is impelled by the spring to the inner end of the slot to repeat the operation.

While the roller at one end of the beam is moving along the inside of the block $i^2$ the roller at the opposite end is moving out along the outer ends of the block $j^2$, so that the feeders at the opposite ends of the machine are operated alternately.

The first forward motion of the lay sets the nippers. As the lay moves back the roller is moved to the outer end of the slot and latched, carrying the feeder into its box. During the next forward movement of the lay the feeder-box is shifted, should the pattern being woven require such change, and the instant the latch $b^1$ is released the roller makes a supplemental movement inward, which carries the feeder to the shuttle to deliver the end of the yarn. The feeder is then withdrawn, on the next backward stroke of the lay, by the passage of the roller down the inclined block $j^2$, and is again projected inward from its box just after the roller passes the end of the block $i^2$, when the two latches are released.

The spring-latch W, when operated to release the picker-block $h$, strikes the latch $b^1$ and releases the feeder-carrier, so that the feeder and shuttle move simultaneously.

Thus far I have described only the mechanism and operations which are intimately connected with the weaving process. I now proceed to describe the several devices which I employ for stopping the operation of the loom in case of breakage of any of the threads or yarns of the warp or filling, or in case of any other derangement in the operation of the mechanism.

These derangements are liable to occur at the following points, to wit: First, the warp-threads are liable to break between the yarn-beam and harness. I therefore apply a device at that point, which will stop the loom in case a thread should break. Second, I apply a device for stopping the loom in case the shuttle should not be driven home, or the feeder should fail to meet the shuttle, and as the shuttle would be arrested or entangled by a broken thread or yarn which crosses the shed, the broken thread is made to stop the operation of the loom. Third, in case the nippers which should seize and hold the ends of the filling-yarn should not get hold of the yarn, I provide a device for causing such failure to stop the loom also.

$a^3$ (see Fig. 7) is the pulley on the end of the shaft $b^3$, to which the power is applied to drive the loom. The power is applied to this pulley by a belt, $c^3$, which passes an upper driving-pulley, $d^3$, and which is tightened by an intermediate tightening-pulley, $e^3$. This tightening-pulley is secured upon the periphery of a wheel, $f^3$, which is centrally pivoted to the side of the frame, and the said pulley is near the upper edge of said wheel, so that by partially rotating the wheel it will act as a lever to force the tightening-pulley against the belt, and thus drive the pulley $a^3$ and shaft $b^3$. The wheel $f^3$ is provided with ratchet-teeth in its lower edge, as shown.

A lever, $g^3$, has one end pivoted to the rear end of the frame A of the loom, and this lever extends forward under the wheel $f^3$. A spring, $h^6$, presses this lever up against the lower edge of the wheel, and a projection or pawl-tooth, $i^3$, on the upper side of the lever, engages with the teeth on the under side of the wheel, when the wheel is rotated to throw the tightening-pulley against the belts.

$j^3$ is an upright hand-lever, which is connected with the lower edge of the wheel $f^3$ by a connecting-rod, $k^3$, so that by drawing the lever forward the wheel is rotated so as to press the tightening-pulley against the belt, and at the same time the notch or pawl-tooth $i^3$ engages with the teeth on the under side of the wheel $f^3$ and locks it in place. A shaft, $l^3$, extends across the front of the loom below the breast-beam, and another, $m^3$, extends across the rear of the loom, as represented. On the outside end of each of these shafts a cam, $n^3$, is secured. The cam on the end of the rear shaft is just above the lever $g^3$, near its rear end, so that when the shaft is rotated the cam will depress the lever $g^3$, and release the pawl or projection $i^3$ from the teeth on the lower edge of the wheel. This releases the tightener from the belt and stops the loom. One end of a lever, $o^4$, is pivoted to the front end of the loom-frame. This lever passes back under the cam $n^3$ of the front shaft, and its rear end rests upon the forward end of the lever $g^3$, so that a partial rotation of the shaft $l^3$ will cause its cam to depress the lever $o^4$, and through it the lever $g^3$, and thus release the belt-tightener in the same manner as the rear shaft.

$p^3$ is a shaft, (see Fig. 6,) which extends across below the driving-shaft $b^3$, and parallel with it. This shaft is driven from the main shaft by means of the gear-wheels $q^3$ and $r^3$. $s^2$ $s^2$ and $s^3$ $s^3$ are vertical shafts, which are supported at the rear of the machine in the plates $t^3$ $u^3$ at a short distance apart.

The arms $v^3$ $v^3$ project forward from the upper end of each shaft. These upright parts or shafts are all connected together by means of arms $w^3$, which lie close to the plate $t^3$, and a cross-bar, $x^3$, which connects the ends of these arms, the same being attached by pivoted or loose joints.

Each alternate arm is connected with its shaft by a spring, $y^3$, so that when a semi-rotary motion is imparted to one shaft all the other shafts will be operated correspondingly and simultaneously; but in case any one of the arms of the alternate shafts which are connected with the cross-bar $x^3$ meets an obstruction its spring will yield and allow the post to remain stationary, while the remaining posts continue their rotation.

An arm or boss, $z^3$, extends from one of the shafts, $s^3$, directly opposite the cam-shaft $p^3$. A cam-arm, $a^4$, projects from each side of the shaft $p^3$ opposite each other, so that when the shaft rotates these arms will successively strike the arm or boss $z^3$. One of these arms is arranged to strike the boss on one side so as to move it in one direction, while the other strikes it on the opposite side and moves it in an opposite direction, thus imparting to the upright shafts $s^3$ an intermittent oscillating motion, and causing the arms $v^3$ to sweep, first in one direction and then in the other, between the two parts of the warp behind the harness. Situated upon each side of shaft $p^3$, and midway between the arms $a^4$, are attached two guide-arms, which operate, whether the boss be at one extremity or the other of its motion, to bring the boss back to its normal position, and the warp sweeps in a position parallel with the threads of the warp.

An arm, $b^4$, extends from the shaft $m^3$, and to the extremity of this arm the upper end of a rod, $c^4$, is attached. The lower end of this rod is attached to the end of a horizontal bar, $d^4$, which passes back under the shaft $p^3$, and its opposite end is pivoted in the upper end of a standard, $e^4$, so that the bar is supported in a nearly-horizontal position.

A rigid arm, $f^4$, projects downward through the lower plate from the middle of the bar $d^4$, and its lower end extends a short distance below the plate, as represented.

An arm, $g^4$, is secured to the lower end of each of the shafts $s^2$ on each side of the pendent arm $f^4$, so that as the shafts are rotated these arms are carried from side to side laterally, so as to strike the pendant $f^4$, and through it force the horizontal bar $d^4$ from side to side.

An arm, $h^5$, projects from the shaft $p^3$, so as to strike the horizontal bar $d^4$ when it is midway between the extreme points to which it is forced by the arms $g^4$, or, in other words, when the bar is at rest. When the machine is in motion and the arms $w^3$ are sweeping regularly back and forth in the rear of the harness, the arms $g^4$ strike the downward-projecting arm $f^4$ first on one side and then on the other, so as to carry the bar $d^4$ first on one side and then on the other side of the arm $h^5$; but if a thread or yarn should break, the positive arm $v^3$ will sweep it crosswise of the warp, and thus prevent a free open shed at the next beat and arrest the motion of the arm $v^2$, shaft $s^2$, and arm $g^4$. This would leave the bar $d^4$ in its intermediate position directly below the rigid arm, so that the arm would strike it and depress its outer end, thus partially rotating the shaft $m^3$, so that the cam $n^3$ will depress the lever $g^3$ and release the belt-tightener, thus stopping the operation of the machine.

The shaft $l^3$, Sheet 7, which extends across the front of the machine below the breast-beam, has a short downward-projecting arm or lever, $i^4$, near each end. An arm, $j^4$, is loosely attached to the lay-frame directly in rear of each arm $i^4$. The forward end of this arm passes under the arm $i^4$ when the lay beats up, and its extremity is bent upward, so that if the arms are raised as the lay beats up it will strike the arm $i^4$ and rotate the shaft $l^3$, and thus release the belt-tightener through the levers heretofore described; but if the outer end of the lever $j^4$ is not raised until the lay starts to beat back, the upturned projection on its extremity will catch on the end of the lever $i^4$ and rotate the shaft in the opposite direction, also loosening the belt in the same manner.

One end of a lever, $k^4$, is rigidly attached to the lever $j^4$. This lever extends upward in front of the lay and is bent at right angles, so that its opposite end rides upon the lower part of the breast-beam when the lay moves back and forth. An inclined flange is formed on one side of this arm near its end, which enables the lever of the movable nipper-blade to operate the disengaging-levers, as hereinafter explained.

A lever, $m^4$, is pivoted to a standard, $n^4$, (see Figs. 1, 4, and 13,) near each end of the breast-beam. This lever extends backward between the shuttle-housing and feeder-box, and is rounded on its rearward lower edge. An extension of this lever (see Fig. 7) passes back under the upper part of the breast-beam, and has a short post, $p^4$, attached to its rear end. This post extends down into a recess in the lower part of the breast-beam, and the recess extends under the end of the lever $k^4$. An arm, $q^4$, is attached horizontally to the lower end of the post $p^4$, so as to extend under the lever $k^4$.

When the lay is beating up and the shuttle and its feeder are properly operating, the lever $m^4$ will ride over them, and the horizontal arm $q^4$ will be depressed into the recess in the breast-beam; but if the shuttle should fail to arrive at home from any cause, or the feeder should fail to be projected from its box into the shuttle-housing, the weight of the lever $m^4$ will cause it to drop upon the race-beam. This raises the pin $q^4$ at its opposite end, which, in turn, raises the arm of lever $k^4$, and through it the trip-lever $j^4$, the outer end of which will engage with the arm $i^4$, so as to rotate the shaft $l^3$, thus releasing the belt-tightener.

The nippers $e^2$, Fig. 13, are so constructed that if the yarn or thread should fail to be caught between its jaws the upper jaw will close down closely upon or through the lower or permanent jaw, $d^2$, and in this case the lever-extension $f^2$ would be thrown up against the short end of the lever $r^4$. It will also be evident that if the weft-yarn should run out or become broken, so that the shuttle should pass across the race without carrying a yarn, the nipper would act in the same manner to stop the loom.

A lever, $r^1$, is suspended by its middle under the breast-beam, so that one end will be directly above the nipper-extension $f^2$, while the opposite end is above the end of the lever $k^4$, Fig. 13, so that when the nippers fail to catch the thread the extension $f^2$ will raise the end of the lever $r^4$, which is above it, and depress the opposite end, so that it will pass under the inclined rib or flange $l^4$ on the side of lever $k^4$. This will raise the lever $k^4$ as the loom moves back, and release the belt-tightener in the same manner as above described; but if the nippers seize the thread or yarn the jaws will be kept sufficiently far apart to prevent the extension $f^2$ from striking the lever $r^4$.

If a thread or yarn of the warp should break, the shuttle will likely become entangled with it and be arrested or prevented from entering its housing. This being the case the rider $m^4$ will drop and operate the trip so as to throw off the belt-tightener and stop the machine.

In weaving fabrics it is requisite that the let-off and take-up device should operate uniformly and evenly. The method heretofore employed of winding the warp upon a shaft or beam at the rear of the machine and winding the cloth upon a shaft or beam at the front of the machine rendered it impossible to regulate the feed and take-up to any uniform gage, because the diameter of the yarn beam or shaft must necessarily decrease, while the diameter of the beam or roller upon which the cloth is wound or taken up is increasing. The devices for operating this part of the machine consist in mounting the shaft or cylinder upon which the warp-yarn is wound upon independent bearings at the rear of the machine, and then winding the warp or yarn partially around one or more roughened drums without passing the same entirely around them.

The take-up device I use consists of two or more shafts or rollers, around and between which the cloth is wound and drawn by friction, so that it does not pass entirely around either, but is simply drawn through and immediately let off again.

By providing the let-off and take-up shafts with a roughened covering, sufficient adhesion of the threads and yarns can be obtained by a single wrap to answer every purpose. The material which I have used to produce this roughened surface is emery, which can be applied with an adhesive substance directly to the surface of the rolls or cylinders; or paper or cloth having an emery surface may be secured around the rollers. $s^4$, Fig. 4, is the let-off shaft or beam, which is provided with a roughened surface. This shaft I feed by means of a worm-gear, $t^4$, Fig. 12, wheel, and friction pawl; and the worm is mounted beneath the shaft $s^4$, near one end of the machine, transversely to the shaft, and a toothed wheel, $u^4$, on the shaft $s^4$ engages with it.

$v^4$, Fig. 5, is a plain-faced wheel, which is secured to the inner end of the worm-gear shaft. The pawl $w^4$ (see Fig. 6) is attached to a link or slotted plate, $x^4$, the lower end of which is attached to the center of the wheel $v^4$, while a wrist-pin on a crank-wheel, $y^4$, works in the slot in its upper end. This crank-wheel is driven by gear-connections with the main shaft. As the crank-wheel rotates, the upper end of the plate $x^4$ is moved back and forth, so that the pawl operates upon the face of the wheel $v^4$ to drive the worm-gear and let-off shaft.

The take-up consists of the two roughened rollers $a^5$ and $b^5$ and $c^5$, (see Fig. 1,) which are connected by gearing, so that they move simultaneously.

After the cloth passes over the breast-beam I carry it directly down and under the roller $b^5$. It is then carried up over the roller $c^5$, and thence either down around the lower roller, $a^5$, or it may be allowed to fold itself upon the floor. I shall usually wind it upon the lower roller. This roller is driven by the motion of the lay, as follows: A toothed wheel, $a^6$, Fig. 4, is secured to one end of the roller. A pawl-lever, $b^6$, extends from the shaft, and has a pawl, $c^6$, which engages with the teeth of the wheel $a^6$. On one side of this lever, near its outer end, is an inclined notch, $d^6$. A pin, $e^6$, on the upper end of an upright arm, $f^6$, moves under this inclined rib, when the lay moves up and raises the pawl-lever, so that the pawl engages a tooth in advance. When the lay recedes so as to release the pin from the incline, a spring, $g^6$, draws the lever down and rotates the wheel and take-up shaft.

This take-up and let-off mechanism I have described, I am aware, is not new, and I do not claim it as my invention. The details here given are inserted to complete the description of my loom.

The device heretofore described for shifting the feeder-boxes is intended for such work as requires a number of feeders, which must be shifted either regularly or irregularly in order to weave plain or fancy cloth. The device, however, which I use for set patterns—such, for instance, as alternate bars or stripes, in which a thread or yarn of one color is fed to the shuttle for a given number of picks, after which the feeder is changed to feed another color—or where a border is to be made—as, for instance, in the manufacture of blankets—I use the following device, (represented at Fig.

11, Sheet 9:) A ratchet-wheel, $j^5$, is mounted on the side of the frame, in rear of the feeder-boxes, upon the rim of which as many ratchet-teeth are made as there are picks in the pattern. This wheel is moved, one tooth at a time, by means of a pawl, $k^5$, and spring-lever $l^5$. This lever is operated by a notch, $m^5$, in a wheel, $n^5$, on the driving-shaft, so that each rotation of the driving-shaft moves the wheel $j^5$ one tooth; and this motion of the wheel occurs while the lay is beating up. The arm $y^2$, that shifts to move the feeder-box D by striking the pins $x x^1$, is mounted above this wheel, and has a pin, $o^6$, projecting downward from it. A block, $p^5$, is secured to the side of the pattern-wheel $j^5$ at the point where it is desired to shift the box D, so that when the pin strikes this block the outer extremity of the lever is depressed, so as to strike the lower pin, $x$, and the box is shifted. The rim or edge of this block $p^5$ corresponds in length with the number of teeth which represent the number of picks in the border, so that the box is held in this position until the border is woven. The pin then drops from the edge of the block $p^5$, and the lever shifts so as to operate upon the upper pin, $x$, and shift the box D back again.

By adjusting one or more blocks, $p^5$, at different points on the face of the wheel, any desired arrangement of bar-patterns can be woven.

The face of the wheel $j^5$ might be made plain, and a friction-pawl applied for driving it. In this case the stroke of the pawl can be regulated or adjusted to give a longer or shorter stroke, and thus accommodate the rotation of the wheel to any pattern.

The lever makes two movements in going up and two coming back; but it only makes one movement to each beat of the lay, there being two beats to effect the movement of the box. The mechanism is shown only on one side. It is evident that by putting it both sides the boxes will move alternately. The lever is for ordinary weaving, so as to alternately shift the box. The ratchet shown in the drawings is for blanket-weaving, and prevents the shifting except when desired.

In the ordinary loom the strain or pull upon the warp occasioned by the beating up of the lay and the shedding of the warp only are depended upon for feeding the warp forward as the weaving progresses. This is the principal cause of the breakage of the yarns. The beating action of the reed serves to draw off a certain length of yarn from the yarn-beam; but when the shifting of the harness adds an additional tension, if any yarn happens to be shorter or weaker than the others, it is broken. It will be noticed, however, that I employ a positive feed, both for the let-off and take-up, and each of these feeds is adjustable according to the character of the yarns and the fabric being woven.

The let-off feed consists of the worm-gear $t^4$, which is driven by the pawl $w^4$ operating on the plain-faced wheel $V^4$. The wrist-pin on the crank-wheel $y^4$ will be adjustable to or from the center of the wheel in a full-sized machine by means of set-screws acting upon it on two sides. In the present instance this pin is represented as being a set-screw. The set of this pin regulates the length of the stroke or pawl $w^4$, and consequently the amount of warp let off of the friction-roller.

The take-up feed is constructed and operated similar to the let-off feed, with the exception that when I am weaving hard yarns or threads the let-off feed operates twice while the take-up feed operates once. The first action of the let-off feed occurs when the reed is beating up a filling, and the amount let off is only sufficient to accommodate the yarn which beats up. At the same time the take-up feed operates and tightens the warp. When the lay moves back and the harness is straining the yarn to open the shed, the let-off feed operates again, and supplies an additional length of yarn to relieve the strain which would otherwise occur; but when the yarns are soft and elastic, such as woolen yarns, the first operation of the let-off feed can be dispensed with, and a full feed given by one operation at the instant the harness is opening. In this case the relaxing of the warp by the closing of the shed will supply enough slack to relieve the yarns.

To guard the points of the sweeping-arms $v^3$ and avoid the liability of a thread crossing the points when the warp is shedding I employ fenders $d^5$. (See Fig. 4.) These fenders I mount in pairs, one pair in front of each arm. The fenders project up through the plate $t^3$, their lower ends being secured to a rock-shaft, $e^5$, below. This rock-shaft is operated by an arm, $f^5$, which projects from the shaft, so that when the outer end of this shaft is depressed by an arm on the shaft $p^3$ the shaft $e^5$ is rotated forward. A spring, $g^5$, rotates the shaft back to its position.

Each pair of fenders passes through and moves in a slot, $h^5$, in plate, $t^3$, and a wedge-shaped finger or divider, $i^5$, extends forward in each slot, so as to point directly between the fenders. After the arms $v^3$ have swept in one direction in the shed of the warp and returned to the position in which they remain while the warp is shedding again the arm on the shaft $p^3$ strikes the lever-arm $f^5$ and rotates the rock-shaft so as to carry the fenders $d^5$ forward past the points of the arms $v^3$ and $v^2$. As they move forward the wedge-shaped dividers $i^5$ separate and spread each pair of fenders, so that one fender of each pair passes on each side of every arm. This clears the warp-threads from arms $v^3$ while the warp is shedding. As soon as the shed is complete the lever-arm $d^5$ is released from the arm on the shaft $p^3$, and the spring draws the rock-shaft and fenders back to their position ready for the arms to sweep in the opposite direction.

I shall also mount a comb or reed behind the harness, and operate it in connection with the fenders. This comb will move in advance of the fenders and carry any broken thread toward the sweeping-arms, so that when the arms sweep across the shed the broken thread will be laid transversely across the warp-yarns in the shed far enough back of the points of the arms to arrest the shedding of that portion of the warp upon which it lies, so that when the arms sweep around again the spring-arm $v^2$ will be arrested by the imperfect shed and operate the belt-tightener.

The devices herein described for stopping the motion of the loom automatically in case of breakage of a thread or yarn are all positive actions, and they are so disposed that it is impossible for a thread to break without affecting some of them.

The momentum of the machine, however, must be arrested at the instant the belt-tightener is loosened; otherwise if the shuttle should happen to stop on the race between the housings it would be carried by the lay into the shed against the cloth or into some of the parts of mechanism on the breast-beam and occasion damage. To avoid this I shall arrange a brake to be operated by the wheel $f^3$, to which the tightener-pulley is attached, so that when the tightener-pulley is withdrawn by any means from the driving-belt the brake will be applied to the driving-pulley $a^3$ and arrest the further motion of the lay. In the present instance I have accomplished this by securing a pin, $l^{12}$, on the wheel $f^3$ in such a position that when the wheel $f^3$ begins to rotate backward after tightening-pulley is loosened it will engage with teeth $m^{12}$ on the driving-pulley $a^3$, and thus instantly stop the mechanism of the loom.

To render the operation of my loom continuous and avoid the necessity of watching the filling or weft-yarn to see that it does not run out, I make a continuous weft-yarn. To do this I place a number of upright spindles, $q^5$, (see Fig. 6,) on platforms $r^5$, which are to be arranged on each side of the machine. The cops or spools upon which the yarn is wound I place upon these spindles, and I then unite the lower end of the yarn or thread of one spindle to the upper end of the yarn of the adjoining cop or spool, so that as soon as the yarn on one cop or spool is exhausted it commences to draw from the next, thus providing a continuous yarn. The attendant can then, at his convenience, supply new cops or spools for those exhausted, and thus keep up the supply without the necessity of exercising vigilance.

This arrangement of cops to form a continuous thread is old, and forms no part of my invention.

I shall usually wind the yarns on paper quills which will fit over the spindles. I prefer to do this because the spinners can build larger cops of filling upon the quills.

Owing to the construction of my machine, it is necessary, in weaving cloth of different widths, to adjust the distance between the housings, because the delivery-nippers of the shuttle and the feeders must leave the ends of the filling-yarn near the edges of the cloth. The requisite portions of the machine are made adjustable to accomplish this result. The simplest method is to make the race-beam and tubular connecting-bar, beam, and reed-holder telescopic; but various methods could be used.

Having thus described my invention, what I claim, and desire to secure by Letters Patent, is—

1. The shuttle or thread-carrier G, provided with a spring-operated nipper jaw or hook, Z, at each end, said nipper or jaw being pivoted at its middle, in combination with the pins K K', permanent standard I, with its set-screw $i$, and the pivoted lever-plate J and fixed spring-plate O, substantially as described.

2. The shuttle-housings H at each end of the race-beam, provided with spring-pins K K' for operating the shuttle-jaws, in combination with the standard I, with its set-screw, and the suspended plate J and fixed spring-plate O, substantially as and for the purpose described.

3. The shuttle or thread-carrier G, grooved in its under side, as described, and having the movable buffer $g^1$, arranged to move against abutments at each end of the groove, in combination with the picker-plate $h$ and its operating mechanism, substantially as and for the purpose set forth.

4. In combination with the shuttle-housings H, a shuttle, G, and spring-bolt $n$, the double-acting trip-lever $p$, and the set-lever $o^1$, adapted to be operated by the motion of the picker-plate, substantially as and for the purpose herein set forth.

5. The trip-lever $p$, the race-beam, and the sliding rod $q$, in combination with a set-lever, $o^1$, arranged as described, whereby both levers are set by the outward motion of the picker-plate, substantially as and for the purpose described.

6. The shuttle or thread-carrier G, provided with a recess or socket, $2^{17}$, in its outside face, in combination with the shuttle-housing H, spring-bolt $n$, levers $o^1 p$, and picker-plate $h$, substantially as and for the purpose described.

7. The shuttle or thread-carrier G, provided with nippers Z at each end, and recess or socket $2^{17}$, in combination with feeders E and operating mechanism, substantially as and for the purpose described.

8. The feeder-tube E, having the springs $a a$, and spring-arms provided with jaws $b$, formed on one end, in combination with the block F, arranged to move on the extension or intermediate tube C, and a spring, $d$, substantially as and for the purpose described.

9. The feeder-tube provided with the extension-springs $a a$, having upon their extremities the jaws $b$, the inside faces of which are inclined, in combination with the shuttle or thread-carrier G, provided with jaws Z and operating mechanism, substantially as and for the purpose described.

10. The block F and the tubular extensions $c$, in combination with the feeder provided with the springs $a\ a$, nipple $e$, and bumper $t$, substantially as and for the purpose described.

11. The combination of a race-beam provided with a cutter having movable blade on each side of the warp with a shuttle which picks up and drops its thread at each pick and their operating mechanisms, substantially as shown, and for the purpose described.

12. The movable shear-blade $I^2$, pivoted as described, and having a notch on its under side, in combination with a spring-latch, $n^1$, and operating mechanism, whereby the shear-blade is closed down and locked, and spring $j$, whereby the said blade is opened when the latch is released, substantially as and for the purpose specified.

13. The movable shear-blade $I^2$, provided with the arm $l$, in combination with the feeder having the sliding lock F, provided with an inclined projecting face, substantially as and for the purpose set forth.

14. The feeder-boxes D D, mounted at the ends of the lay upon a center, Z, about which they move, and provided with the downward-projecting arm or lever $r$, in combination with the notched plate $s$, wheel $w^1$, with its pins $x$ $x^1$, and the push-arm $y''$, and operating mechanism, substantially as and for the purpose described.

15. In a loom, connecting tubular beam, P, slotted at each end, secured across the lay-frame below the race-beam, in combination with the feeder-carriers, substantially as and for the purpose described.

16. The feeder-carriers $u$, rods $v$, and spring $w$, in combination with the feeders E and the shuttle G, substantially as and for the purpose described.

17. The feeders E, each of which is provided with a lug, $f$, on its under side, in combination with the transversely-slotted feeder-carrier $u$, rods $v$, and actuating-springs $w$, substantially as set forth.

18. The feeder-carriers $u$, provided with the transverse slot $y$, in combination with the feeder-box D, with its springs $y^1$, and stop-pins $i^6$, substantially as and for the purpose described.

19. The combination of a spring-picker plate, $h$, and a feeder-carrier, $u$, with their operating-latches W and operating mechanism, whereby they are released simultaneously by the same device, substantially as and for the purpose described.

20. The lay and the horizontally-oscillating block $d^1$, mounted on the front of the race-beam of the same, and provided with arms or pins $p^1$, in combination with the shear-lever latches and the swinging plate or arm $c^1$, and mechanism, as specified, for operating the same, as and for the purpose set forth.

21. The shallow box $h^3$, having the block $z^1$ secured in its rear open end midway between the sides, thereby forming a groove on each side of it, and provided with the V-shaped pivotal switch-plate $j^1$ in front of said block $z^1$, in combination with the swinging plate $c^1$, with its roller $m^1$ on its under side, substantially as and for the purpose described.

22. The picker-latch-releasing mechanism, consisting of the vibrating lever-arm $f^1$, pivoted near its middle on the arm $e^1$, and having the latch-operating pin or projection $g^2$ on its rear end and a longitudinal slot in its forward end, in combination with the vibrating switch-block $j^1$, with its downward-projecting pin $l^1$, substantially as and for the purpose described.

23. The combination of the swinging plate $c^1$, attached at its rear end to the horizontally-vibrating block $d^1$, and provided with the pin or stud $m^1$, switch $j^1$, race $h^3$, and vibrating lever $f^1$, the several parts being arranged as described, and adapted to be operated by the movement of the loom-lay, substantially as and for the purpose set forth.

24. The slotted needle-plates $q^1$, each of which is provided with a curved needle, $s^1$, in combination with the swinging plate $c^1$, with its pins $v^1$, and operating mechanism, substantially as and for the purpose described.

25. The permanent or fixed jaw $d^2$, mounted on a sliding block, $x^1$, in combination with the movable jaw $e^2$, with its lever-extension $f^2$, and block $m^1$, provided with the inclined ledge or groove G, substantially as and for the purpose set forth.

26. The nipper-block $x^1$ and spring $z^2$, in combination with the slides $a^2\ a^2$ and bolt $m^2$, lever 100, and its actuating-spring, whereby the block is set by the motion of the lay and latched by the said bolt $m^2$, substantially as and for the purpose described.

27. In combination with the nipper-block $x^1$, slides $a^2\ a^2$, and lever $c^2$, for setting the nippers, movable jaw with extension $f^2$, with its pin $h^4$, and block $M^1$, provided with the inclined ledge $G'$, substantially as and for the purpose described.

28. The blocks or guide-rails $i^2$ and $j^2$ and $p^2$, arranged as described, and the inclined spring-block $k^6$, arranged to be depressed into a recess in the plate Q, in combination with the feeder-carrier provided with roller $a^1$, substantially as set forth.

29. Plate Q, provided with the projection $n^2$, in combination with feeder-carrier and latch $b^1$, substantially as specified.

30. The pulley $a^3$ on the driving-shaft, driving-pulley $d^3$, and belt $c^3$, in combination with a wheel, $f^3$, provided with the tightening-pulley $e^3$, mounted eccentrically on said wheel, the lower edge of which is toothed, and a lever, $g^3$, provided with the pawl $i^3$ on the lever $g^3$, the lever-handle $j^3$, and connecting-rod $k^3$, substantially as and for the purpose set forth.

31. The pulley $a^3$ on the driving-shaft, driving-pulley $d^3$, belt $c^3$, wheel $f^3$, provided with the tightening-pulley $e^3$, in combination with the protection-shaft $m^3$, with its cam $n^3$, and the lever $g^3$, substantially as and for the purpose described.

32. The front protection-shaft, $l^3$, with its arms $i^4$, in combination with the arms $j^4$ and $k^4$ and the riders $m^4$, with their rear extensions, $o^5$, posts $p^4$, and arms $q^4$, substantially as and for the purpose described.

33. The suspended lever $r^4$, in combination with the extension-lever $f^2$, of the movable nipper, arm $k^4$, provided with the flange $l^4$, all constructed and arranged to operate substantially as and for the purpose described.

34. The series of upright parallel posts $s^2$ $s^3$, with their sweeping-arms $v^2$ $v^3$, said posts being connected together alternately by arms $w^3$ and spring-arms $y^3$ and the cross-bar $x^3$, in combination with the cam-arms $a^4$ of the shaft $b^3$ and the boss $z^3$, substantially as and for the purpose described.

35. The swinging bar $d^4$, standard $e^4$, rod $c^4$, and the arms $g^4$, in combination with the arm $h^5$ of the shaft $p^3$ and arm $f^4$, all constructed and arranged substantially as and for the purpose described.

36. The fenders $d^5$, attached to a rock-shaft, $e^5$, the arm $f^5$, and spring $g^5$ and plate $t^3$, directly in front of each sweeping-arm $v^2$ $v^3$, in combination with the wedge-shaped divider $i^5$, substantially as and for the purpose set forth.

37. In combination with devices, substantially as described, for loosening the tightening-pulley $e^3$, the wheel $f^3$, provided with pin $l^{12}$, and the driving-pulley $a^3$, provided with teeth $m^{12}$, combined and arranged to operate substantially as and for the purpose described.

In witness whereof I have hereunto set my hand and seal.

ROBERT H. H. HUNT. [L. S.]

Witnesses:
JOHN L. BOONE,
FRANK A. BROOKS.